United States Patent [19]
Pharo

[11] Patent Number: 5,427,830
[45] Date of Patent: Jun. 27, 1995

[54] CONTINUOUS, INFLATABLE PLASTIC WRAPPING MATERIAL

[75] Inventor: Daniel A. Pharo, Valencia, Calif.

[73] Assignee: Air Packaging Technologies, Inc., Valencia, Calif.

[21] Appl. No.: 960,942

[22] Filed: Oct. 14, 1992

[51] Int. Cl.⁶ .............................................. B29D 22/00
[52] U.S. Cl. .................... 428/35.2; 428/35.7; 428/43; 206/522; 383/3; 383/38; 156/308.4
[58] Field of Search ............ 428/35.2, 35.7, 43; 206/522; 383/3, 38; 156/308.4

[56] References Cited

U.S. PATENT DOCUMENTS 5,180,060  1/1993  Forti et al. ........................ 206/522

Primary Examiner—George F. Lesmes
Assistant Examiner—C. Raimund
Attorney, Agent, or Firm—Donald S. Dowden

[57] ABSTRACT

A continuous, two-ply thermoplastic film material, sealed in a manner that forms superimposed panels into individual, inflatable bags that are repeated and separable, individually or in groups of bags, forms a continuous packaging material. The material can be cut or torn from preformed rolls to a desired size to over-wrap a product with an air cushion. Valves are sealed into the material at repeated locations to allow air insertion at any location or to allow a primary air chamber to feed any length of pre-sealed bag material that can be sectioned and filled with air at the same time. The invention also allows wrapping of a product first, without air, and insertion of the wrapped product into a carton or box with provision for inflating the wrapping to conform tightly to the product, inside the carton or box. The wrapping material can be recycled either as a reusable, inflated wrapper or made of biodegradable plastic materials to minimize environmental damage.

18 Claims, 24 Drawing Sheets

FIG. 1B1

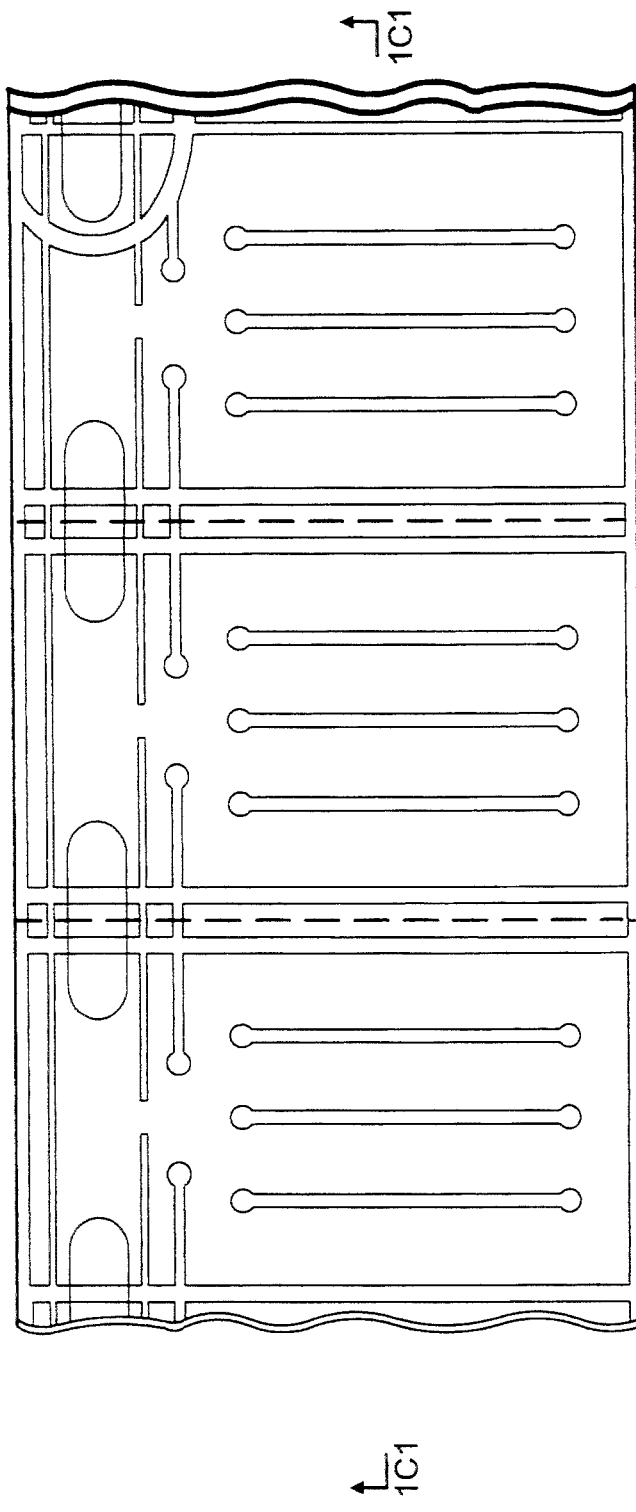
FIG. 1C
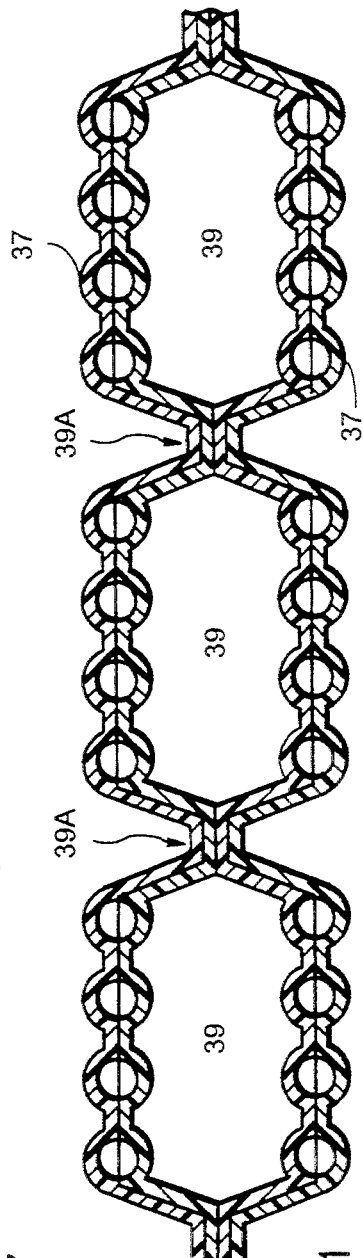
FIG. 1C1

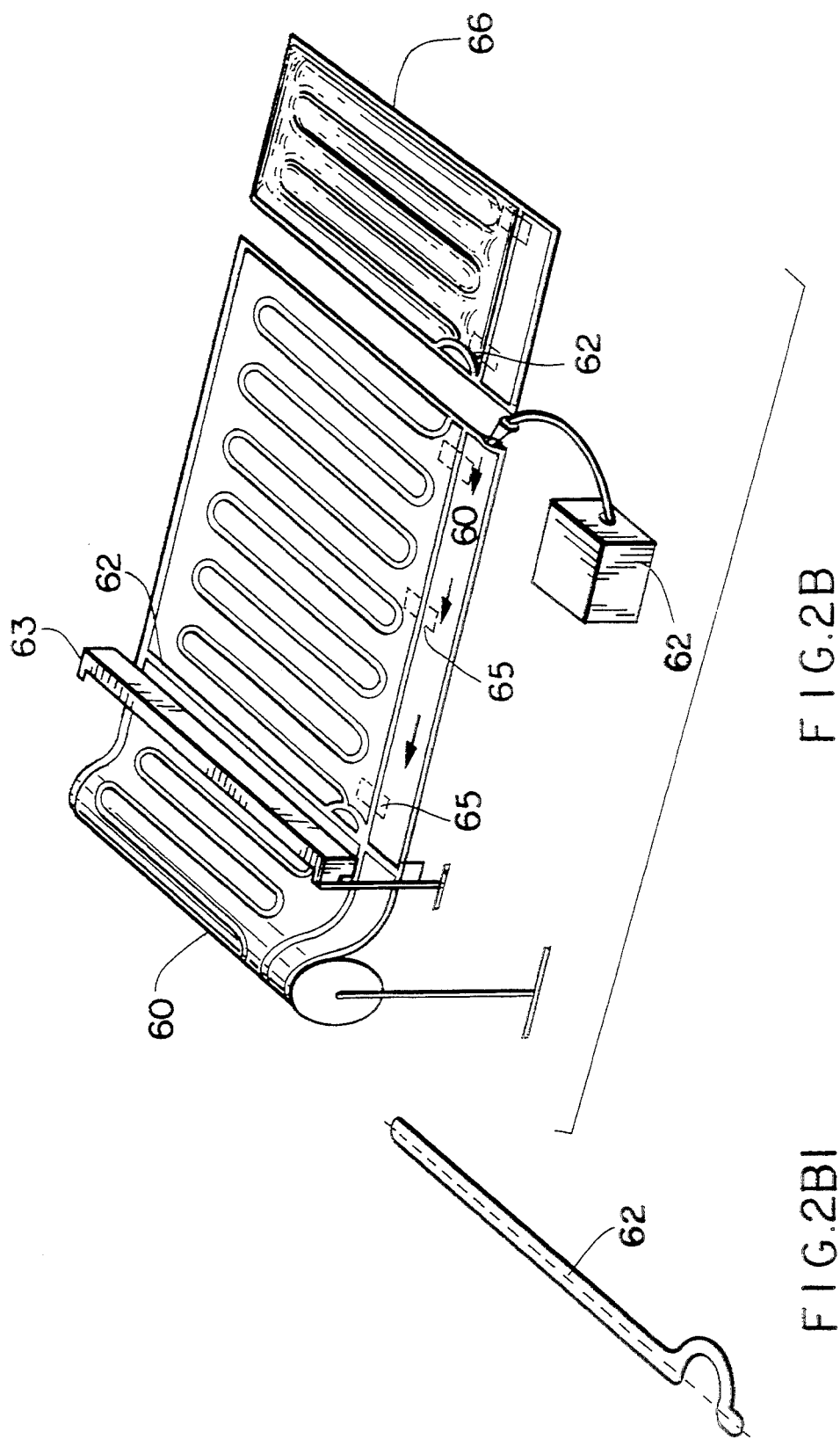

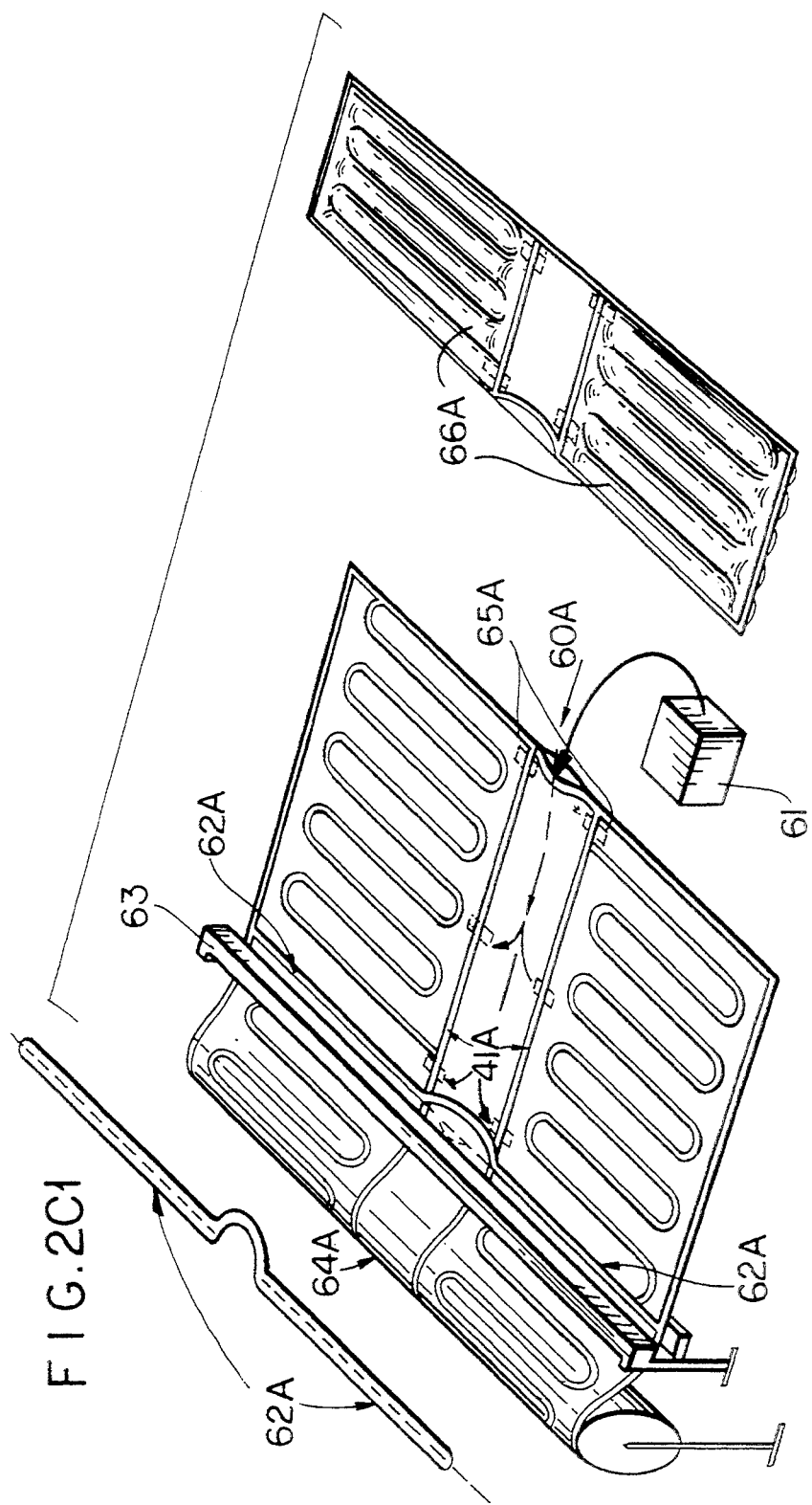

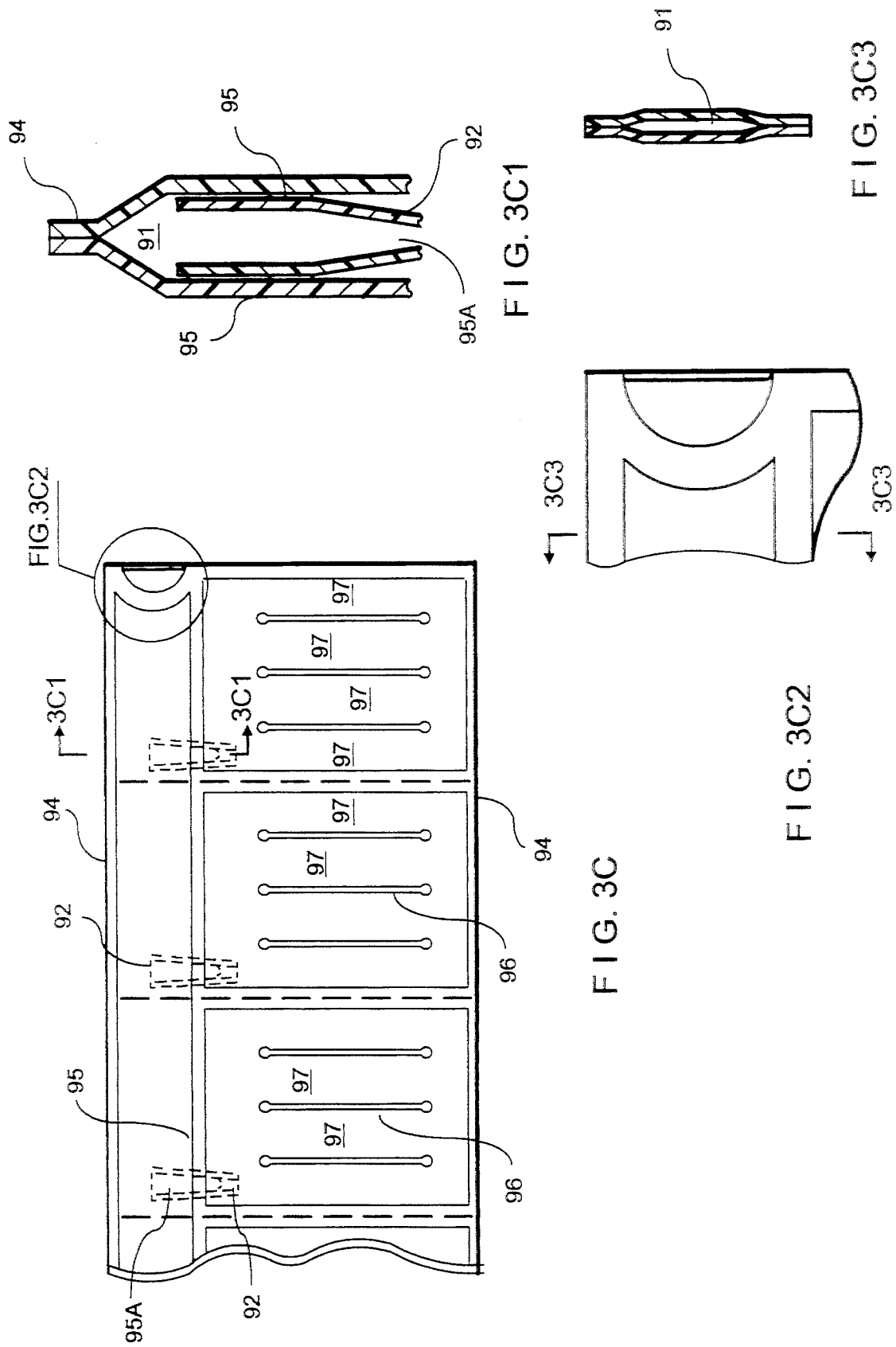

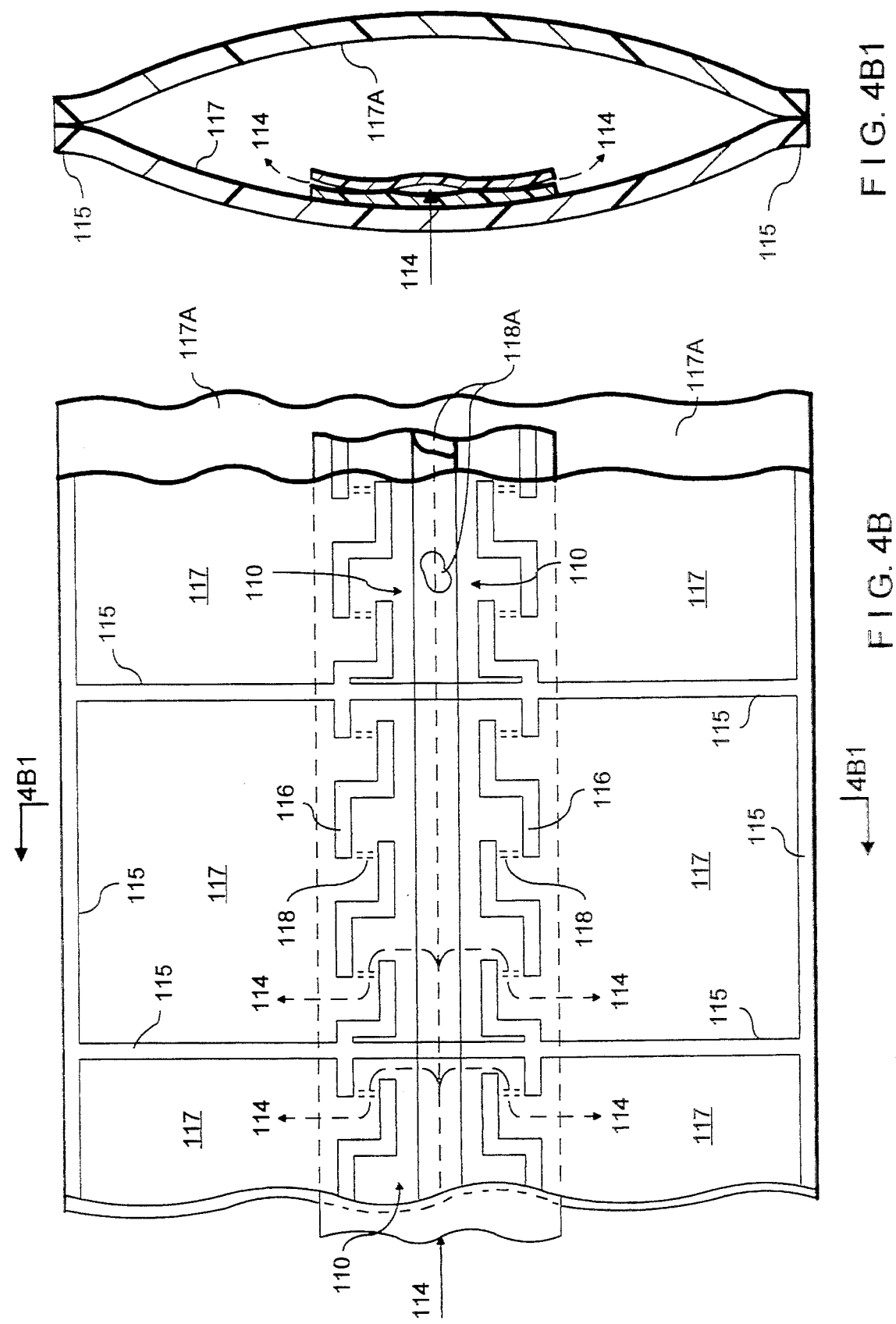

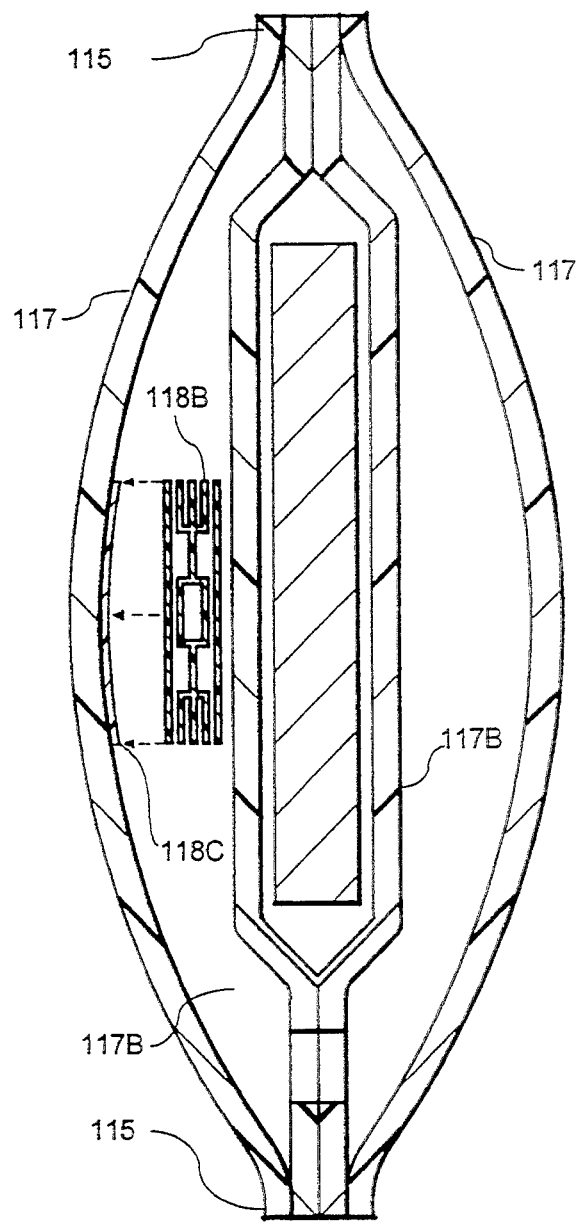
FIG. 4C1

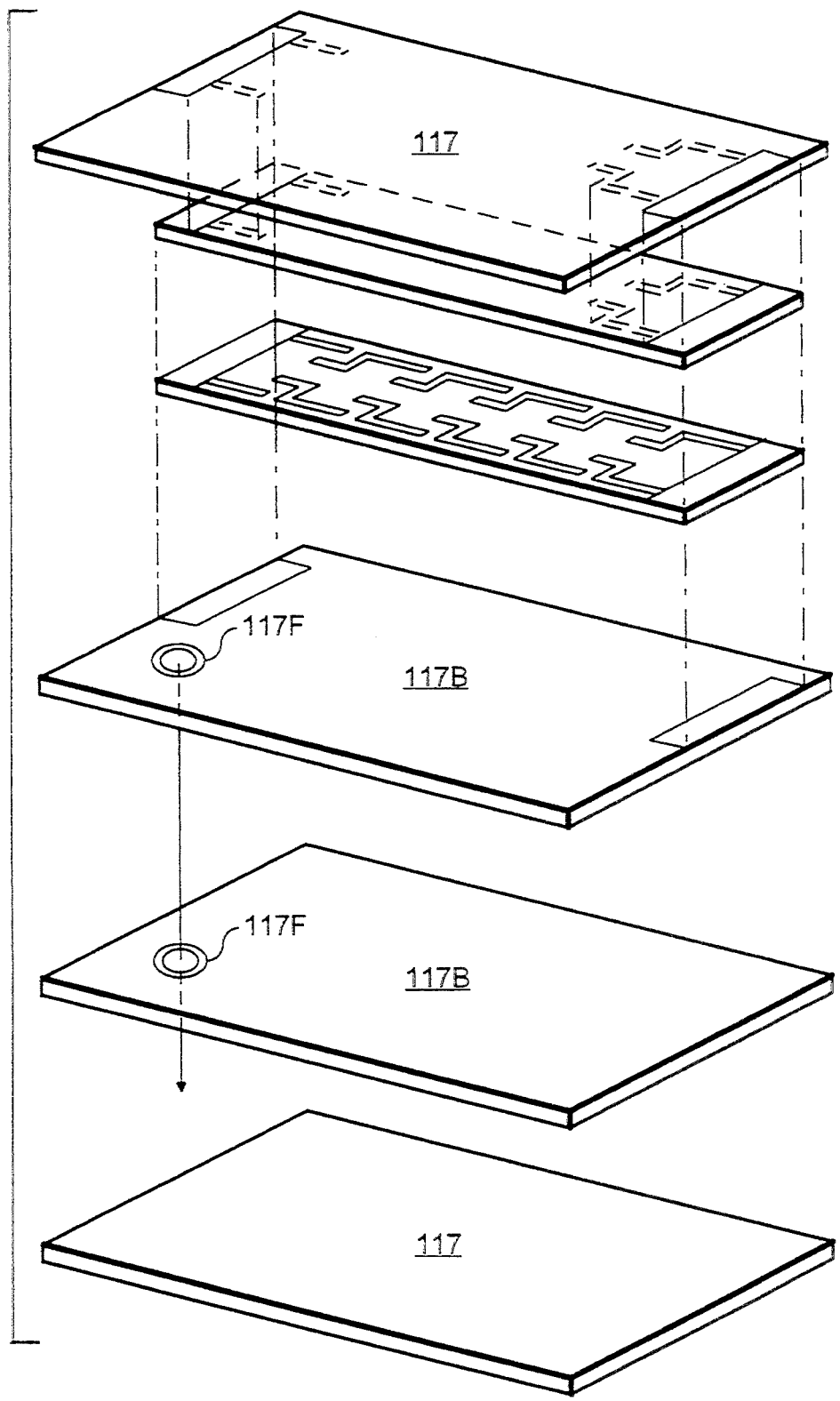
FIG. 4D1

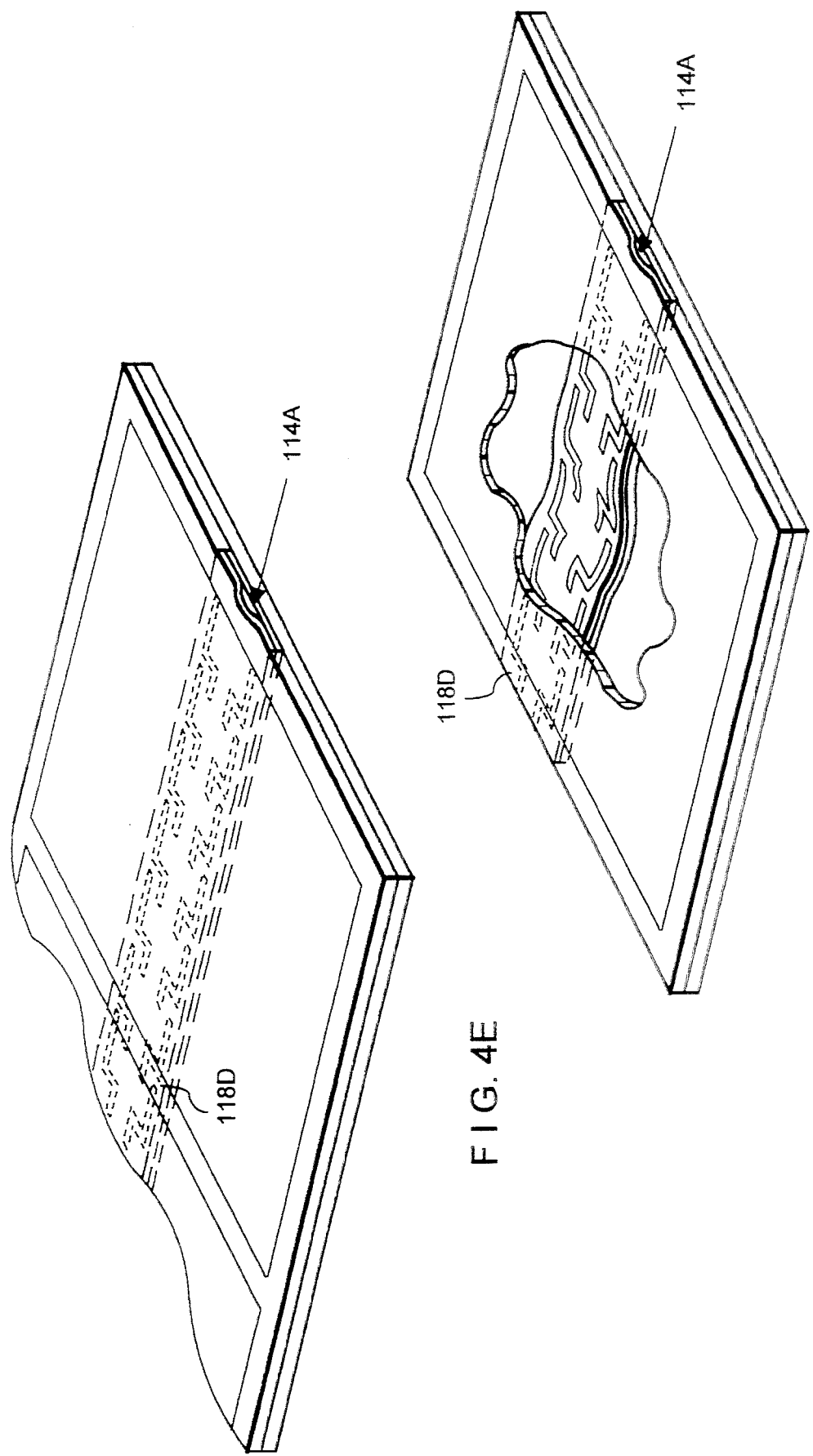

CONTINUOUS, INFLATABLE PLASTIC WRAPPING MATERIAL

BACKGROUND OF THE INVENTION

1. Field of the Invention

This invention relates to the use of lightweight, waterproof and airtight thermoplastic material in film form, as a protective package.

2. Description of the Prior Art

Conventional packaging materials include notably a pre-inflated material known as "bubble pack." Bubble-pack, made by Sealed Air Corporation, consists of two layers of thin plastic material such as polyethylene or vinyl formed with random bubbles between the layers and filled with air at time of manufacture, thereby requiring large rolls of bubble material that displace a great deal of volume in trucks, rail cars and in storage before use.

Conventional packaging materials such as pre-inflated bubble-pack are bulky and therefore expensive to ship to a user of the materials and to store during the period before they are put to use. Moreover, conventional packaging materials such as bubble-pack provide limited protection in certain applications because of the fixed bubble diameter, height and count in a given material area.

Daniel A. Pharo has pioneered and patented several improvements in inflatable packaging devices. His patents include:

U.S. Pat. No. 4,597,244, dated Jul. 1, 1986 for "METHOD FOR FORMING AN INFLATED WRAPPING";

U.S. Pat. No. 4,793,123, dated Dec. 27, 1988 for "ROLLED-UP PACKAGING SYSTEM AND METHOD";

U.S. Pat. No. 4,872,558, dated Oct. 10, 1989 for "BAG-IN-BAG PACKAGING SYSTEM";

U.S. Pat. No. 4,874,093, dated Oct. 17, 1989 for "CLAM-LIKE PACKAGING SYSTEM";

U.S. Pat. No. 4,918,904, dated Apr. 24, 1990 for "METHOD FOR FORMING CLAM-LIKE PACKAGING SYSTEM";

U.S. Pat. No. 4,949,530, dated Aug. 21, 1990 for "METHOD FOR FORMING BAG-IN-BAG PACKAGING SYSTEM";

The disclosures of the patents cited above are incorporated herein by reference. In addition, there are several patent applications of Pharo pending within the same field.

Pharo's prior patents involve distinct, separate pouches or bags that are manufactured automatically, one or more at a time, from two or more plies. In the case of a four-ply bag, the Pharo patents disclose the use of inflation air chambers and isolation of the; inflation air from the inner chamber, thereby shrinking and locking a product in the center of the four-ply bag with a total air cushion around the product. The unique valving and air transfer system disclosed in the prior Pharo patents enable the filling of the outer bag and shrinking of the center bag.

A common limitation of the bags disclosed in the prior Pharo patents is that each bag has a fixed size or dimension before filling with air.

OBJECTS AND SUMMARY OF THE INVENTION

An object of this invention is to provide an improved packaging material and method whereby the problems of the prior art outlined above are overcome.

The foregoing and other objects are attained in accordance with the invention by providing an inflatable wrapping material for wrapping a product, the wrapping material comprising: a plurality of thermoplastic, flexible, elongate film plies disposed in overlying relationship to each other, the plies being formed with a pattern of heat seals defining a plurality of chambers along the length of the plies; a primary channel extending between the plies along the length thereof through which an inflation medium is transmitted along the length of the plies; and one-way valve means connecting the primary channel to each of the chambers; whereby the wrapping material can be stored and shipped uninflated and any desired length thereof can be selected for wrapping a product and inflated by said inflation medium, said wrapping material therefore occupying relatively little space during storing and shipping and in use protecting the wrapped product by providing a cushion including the inflation medium.

In accordance with an independent aspect of the invention, there is provided a method of forming an inflatable wrapping material, uninflated and in roll form for customized use at a user's packaging station, the method comprising the steps of: providing two plies of superimposed, thermoplastic, flexible films, each film having a thickness within the range of 0.005" to 0.060"; forming a continuous heat-seal pattern that segments the plies into a plurality of separate chambers; forming a primary channel through which injected air is transmitted along an unlimited length of said plies; and forming one-way valve means for diverting portions of said air into the individual chambers; whereby a user can select a length of roll stock when packaging a product, wrap the selected length of roll stock around the product in one or more directions, and inflate the selected length of roll stock to provide an air cushion for protecting the product.

In accordance with a further independent aspect of the invention, there is provided a method of forming an inflatable wrapping material comprising the steps of: stacking a plurality of plies of elongate, thermoplastic, flexible film to form a composite elongate structure; forming a continuous heat-seal pattern segmenting the composite structure into separate, inflatable chambers disposed serially along the length of the composite elongate structure; forming a channel along the length of the composite elongate structure; and forming one-wave valve means connecting the channel to each of the chambers; whereby: the composite elongate structure can be separated at a selected location to provide a desired length of wrapping material for wrapping a product, said length of wrapping material including at least one of said chambers; and said at least one chamber can be inflated to provide a cushion for protecting the product.

This invention is thus an improvement of Pharo's prior art, specifically a method and product that provide an "air cushion" trapped between thin thermoplastic films from 0.005" to 0.060" thick. These films are sealed hermetically and leak-proof as well as strong and puncture resistant. Novel valves are used for ingress of inflation air furnished from compressors or even by mouth.

The improvement involves the provision of continuous, heat-sealed bags or heat-sealed mazes that are connected in roll form, yet can be separated by cutting off or tearing off section lengths, without damaging the internal air-integrity of the sealed-bag system.

In contrast to the prior art, the present invention enables shipping of air packaging material in rolls of pre-sealed but unfilled compartments, thereby solving the problem of cubic displacement in bubble-pack type materials. This is accomplished by inflating the packaging material at time of use. One roll made in accordance with this invention requires only a small percentage of the volume required to ship a similar square footage of pre-filled bubble pack, prior to use of the bubble pack. In addition to freight and space savings there are economies in the use of packaging-room areas, where large spaces are required to store pre-inflated bubble-wrap materials.

The present invention provides a novel, continuous roll of sealed mazes or bags that can be selectively filled in any length, then cut from the master roll without any deleterious effect on the integrity of the heat seals along the entire length of sealed material.

The present invention makes it possible to eliminate 95% of the volume required to ship and store bubble-pack material and in addition provides individual product-size packaging and inflation before or after insertion in a carton, thereby maximizing the use of carton space. In addition, the invention makes it possible to customize the wrap configuration around a product of complicated shape by wrapping first, then inflating the wrapping material. The air and sealed bags then follow the path of least resistance to the fill pressure, thereby providing "skin-tight" conformed air protection to the product, such as a camera, electronic component, lamp or other item having a complicated shape. This is difficult to do with conventional bubble-pack or individual air-filled bags.

BRIEF DESCRIPTION OF THE DRAWING

Other objects, features and advantages of this invention will become apparent from the following description and accompanying drawings, wherein:

FIG. 1B1 is a sectional view taken on FIG. 1B;

FIG. 1C is a plan view of another embodiment of the invention;

FIG. 1C1 is a sectional view taken on FIG. 1C;

FIG. 2B is a perspective view illustrating certain features of the invention;

FIG. 2B1 is a perspective view of a heat seal formed in accordance with the invention;

FIG. 2C and 2C1 are views respectively corresponding to FIGS. 2B and 2B1 but showing another embodiment of the invention;

FIG. 3C is a plan view showing the attachment of a two-ply valve in accordance with the invention;

FIG. 3C1 is a sectional view of a portion of FIG. 3C;

FIG. 3C2 is an enlarged plan view of a portion of FIG. 3C;

FIG. 3C3 is a sectional view taken along the line 3C3-3C3 of FIG. 3C2 and looking in the direction of the arrows;

FIG. 4B is a plan view of a modification of the structure of FIGS. 4 and 4A;

FIG. 4B1 is a sectional view of the structure of FIG. 4B;

FIG. 4C1 is a sectional view corresponding to FIG. 4C showing still other features of the invention;

FIG. 4D1 is a view similar to FIG. 4D showing a dual-chamber inflatable bag constructed in accordance with the invention;

FIGS. 4E and 4E1 are fragmentary perspective views of a completed inflated bag system in accordance with the invention;

EXPANDED DESCRIPTION OF THE DRAWINGS, WITH REFERENCE CHARACTERS

Figure 1:
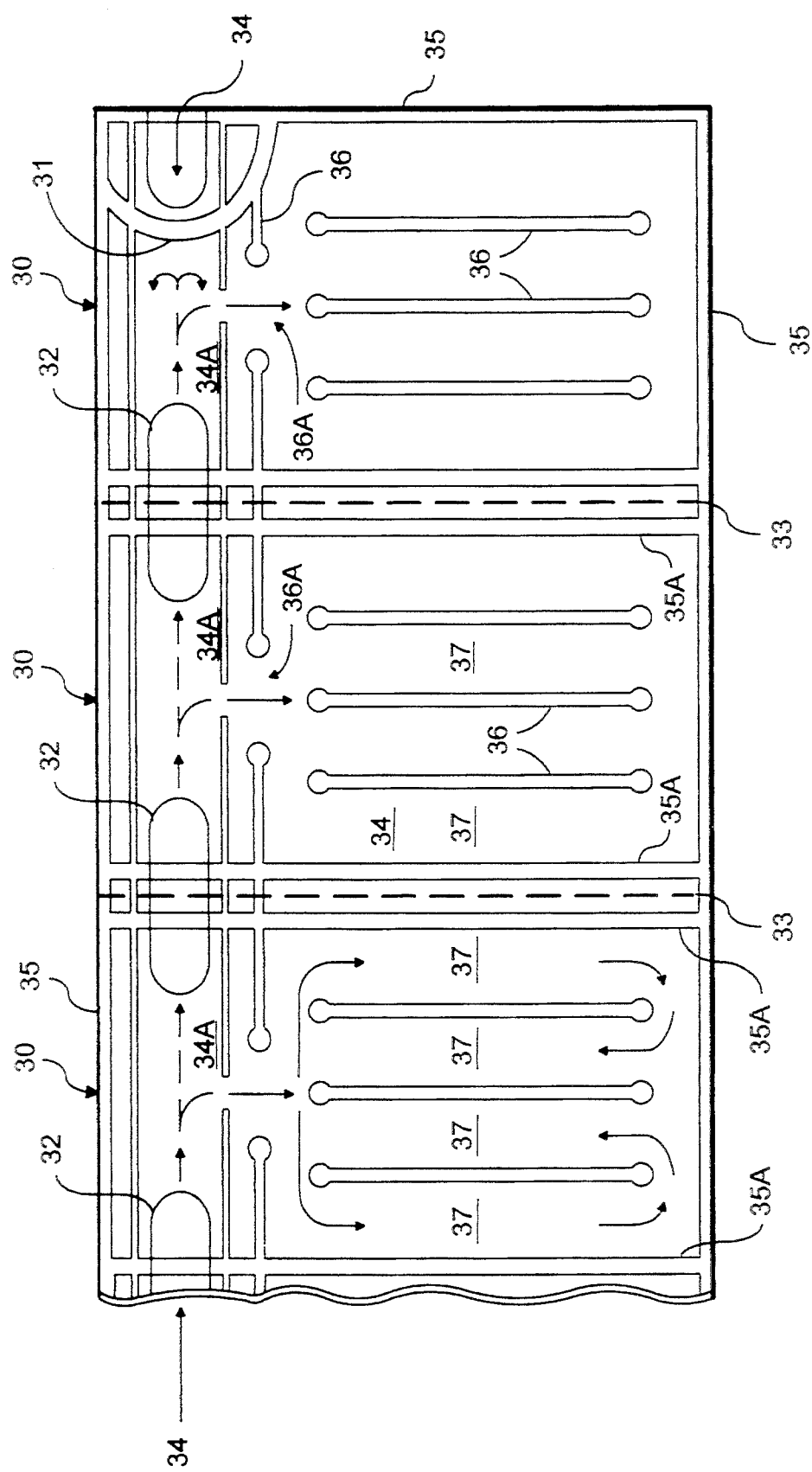
FIG. 1 is a plan view of a first embodiment of a wrapping material constructed in accordance with the invention.

FIG. 1 is a plan view of a strip 30 of three connected inflatable bags, with a common air ingress port and distribution channel to each of the three bags.

30 Connected strip of three individual bags.

31 An optional closure seal to prevent air escape

32 A heat resistant print pattern 32 maintains air access to all bags

33 Perforations, optionally used to separate one or more bags from a continuous roll of pre-sealed bags 34 Ingress of air 34 can be provided at either end of the bag strip 30

34A A primary channel 34A distributes air to each bag

35 Perimeter seals, each bag

35A Portions of perimeter seals 35 extending in a transverse direction.

36 Channel seals 36 effect quilted cushioning by enabling expansion between seals 36 but preventing expansion at the seals.

37 Access ports 37 transfer air from the primary channel to each bag.

Figure 1A:
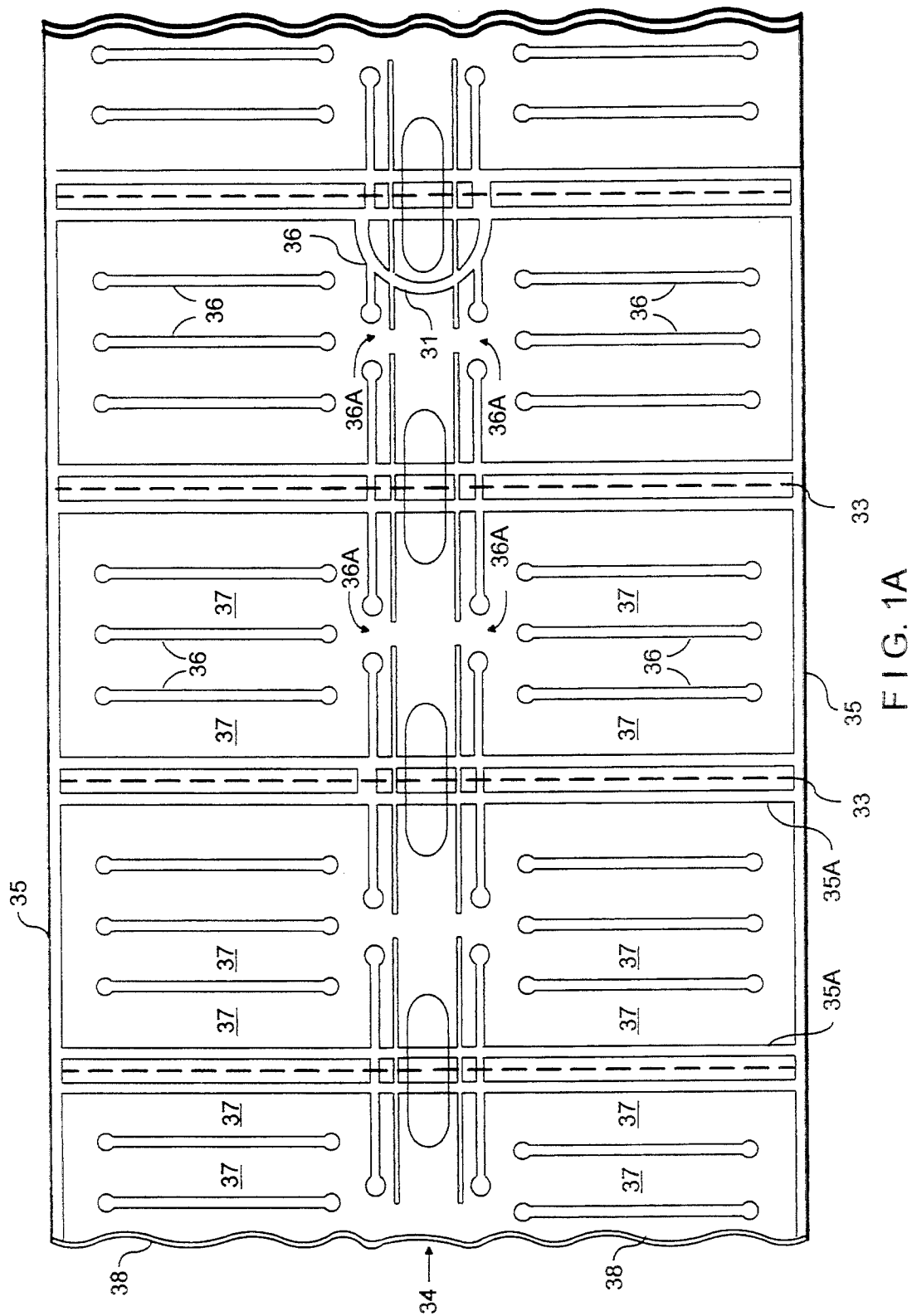
FIG. 1A is a plan view of a modification thereof.

FIG. 1A depicts a continuous strip of connected inflatable bags, as in FIG. 1, but arranged two-up (i.e., in two horizontal rows) with air ingress through the center of each pair. In other words, the channel 34 extends between the two rows.

Perimeter seals 35 and transverse seals 35A are provided for each pair of bags.

Channel seals 36 effect quilted cushioning as explained above.

Access ports 37 transfer air from the primary channel to the bags.

Vertically, paired bags 38, two per section, can be separated from the adjacent bag pairs by perforations 33 or left connected and sealed off by a closure seal 31.

Figure 1B:
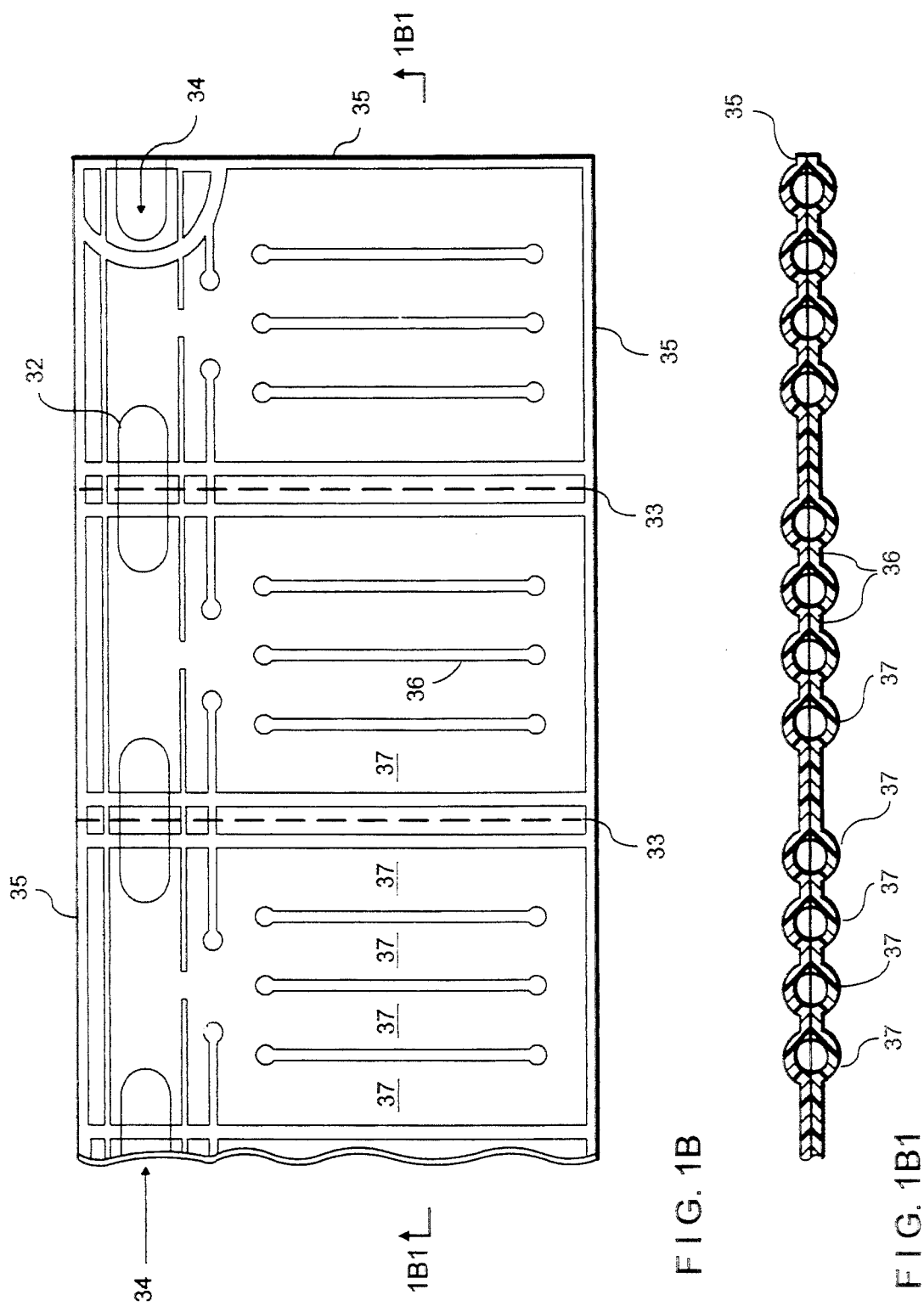
FIG. 1B is a view similar to FIG. 1 included in connection with a disclosure of other features thereof.

FIGS. 1B and 1B1 depict a strip of three individual connected bags, inflated for use as a wrapper with air-cushioning.

32 Heat resistant print pattern
33 Perforations
34 Ingress of air from either side
35 Perimeter seals
36 Channel seals
37 Tubular channels FIGS. 1C and 1C1 depict a modification of the embodiments of the invention shown in FIGS. 1B through 1B1 whereby a tubular package is formed by joining two or more single groups of tubular channels.

33 Optional perforations
39 Duplex tubular configuration
39A Optional intermediate heat seals to provide multiple tubes (omission provides single tube)

Figure 2:
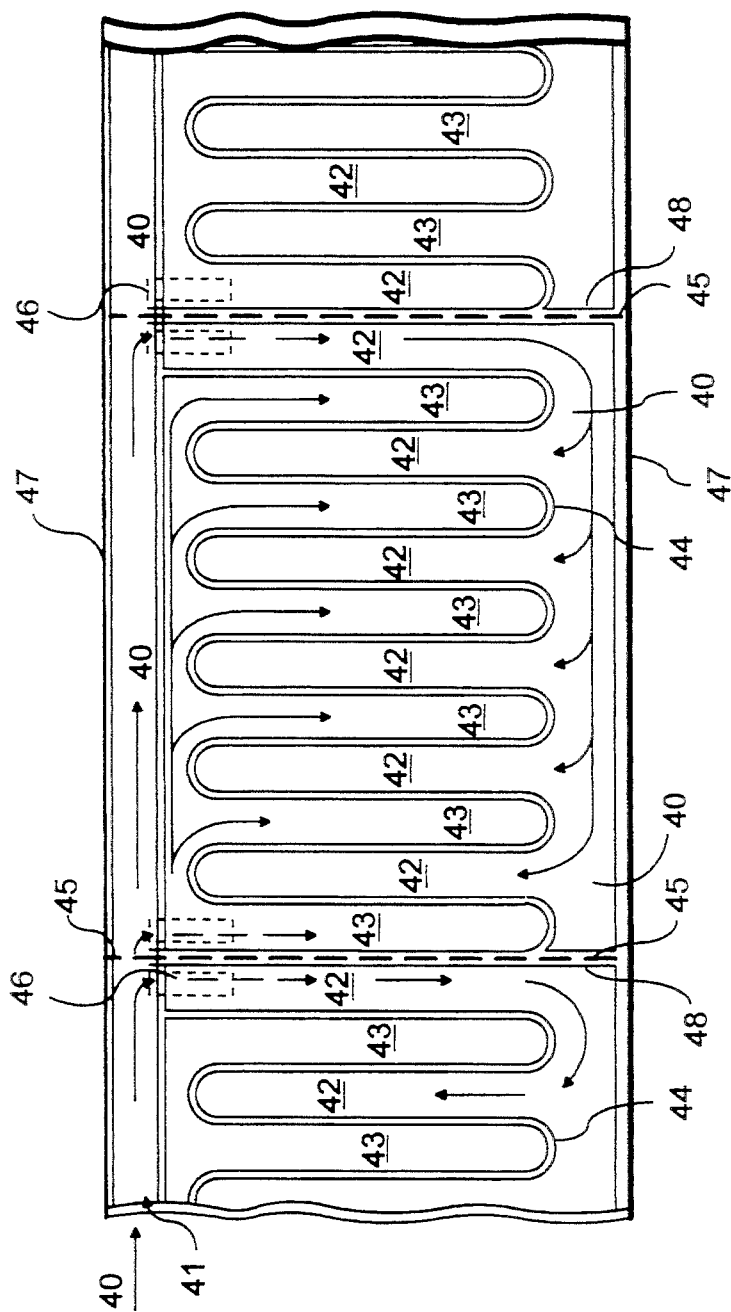
FIG. 2 is a plan view showing another embodiment of the invention.

FIG. 2 depicts a modification of the invention providing a novel channel system.

Figure 2A:
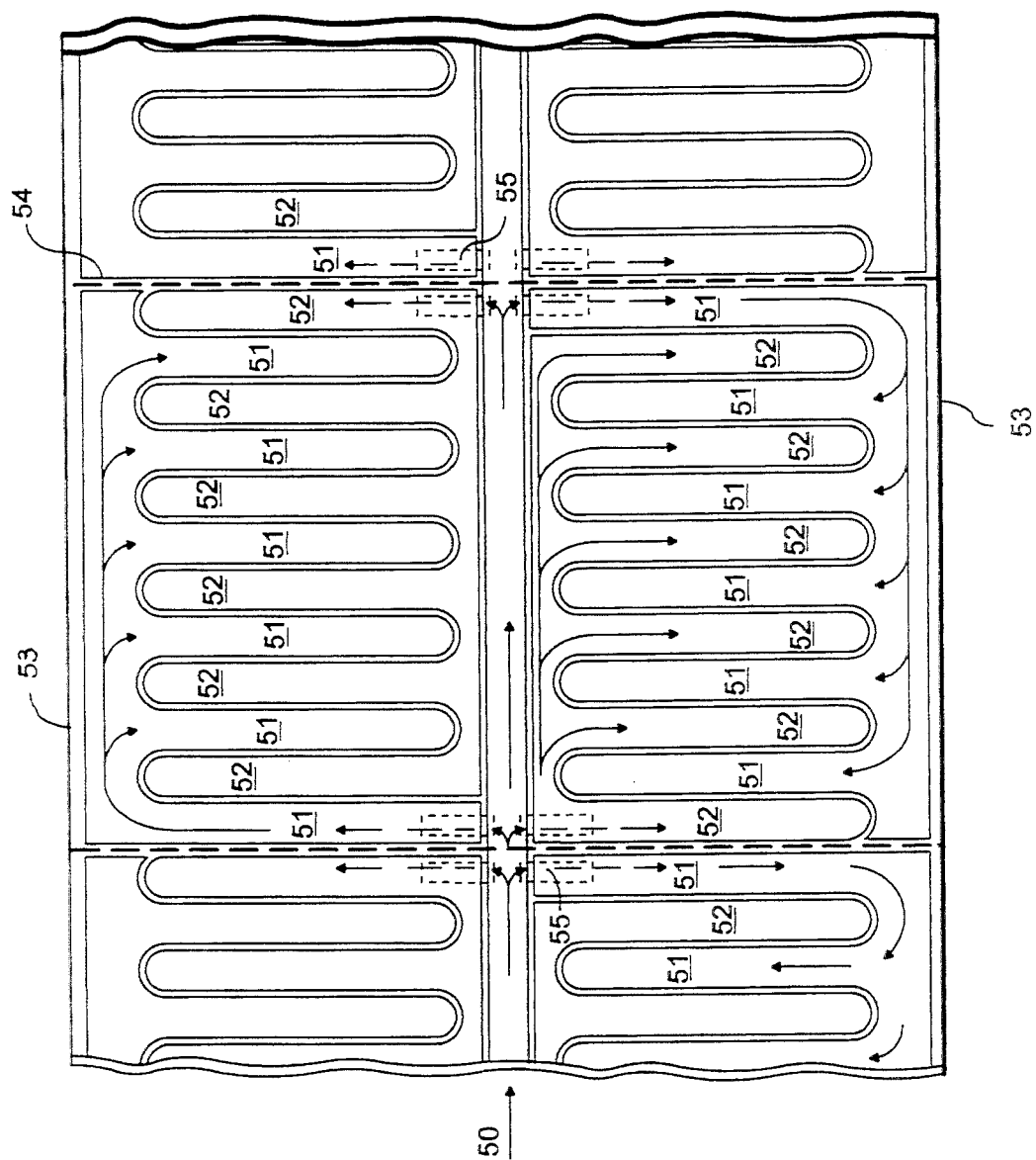
FIG. 2A is a plan view showing a modification of the structure of FIG. 2.

40,41 Air enters in a ingress direction shown by an arrow 40 via a primary air ingress channel 41 of a one-upbag system (i.e., a system having one horizontal row of bags).
42,43 First compartments 42 are provided within one bag section, and second compartments 43 are provided within another bag section.
44 A separation seal 44 defines the compartments 42 and 43.
45 An optional perforation 45 enable separation of each bag.
46 One-way, self-sealing valves 46 enable transfer of air from the primary air ingress channel 41.
47 Perimeter seals 47 unite edges of the bags, which comprise two plies.
48 Transverse portion of perimeter seals 48 join adjacent bags, each of which has two compartments FIG. 2A shows air ingress direction 50 of a modification of FIG. 2, defining a mirror-image pair of bags in a two-up system 51 First compartment within one bag section
52 Second compartment within one bag section
53 Perimeter seals combining outer edges of dual bag system
54 Transverse portion of perimeter seals, separating a dual bag section
55,55A One way, self-sealing valves for transfer of air to both compartments of both bags from the central primary air ingress channel FIGS. 2B and 2B1 show continuous roll of connected but individual bags that can be inflated 60 Air ingress direction
61 Air compressor
62 Heat seals separating one or more connected bags
63 Heat sealer with optional perforating blade
64 Roll of flat, pre-sealed bags
65 One-way, self-sealing valves for transfer of air to compartments in each bag section
66 Finished, single bag, inflated and separated from roll FIGS. 2C and 2C1 depict an extension of FIGS. 2, 2A and 2B, whereby a dual-image bag structure is filled with air from a central channel.

Figure 3:
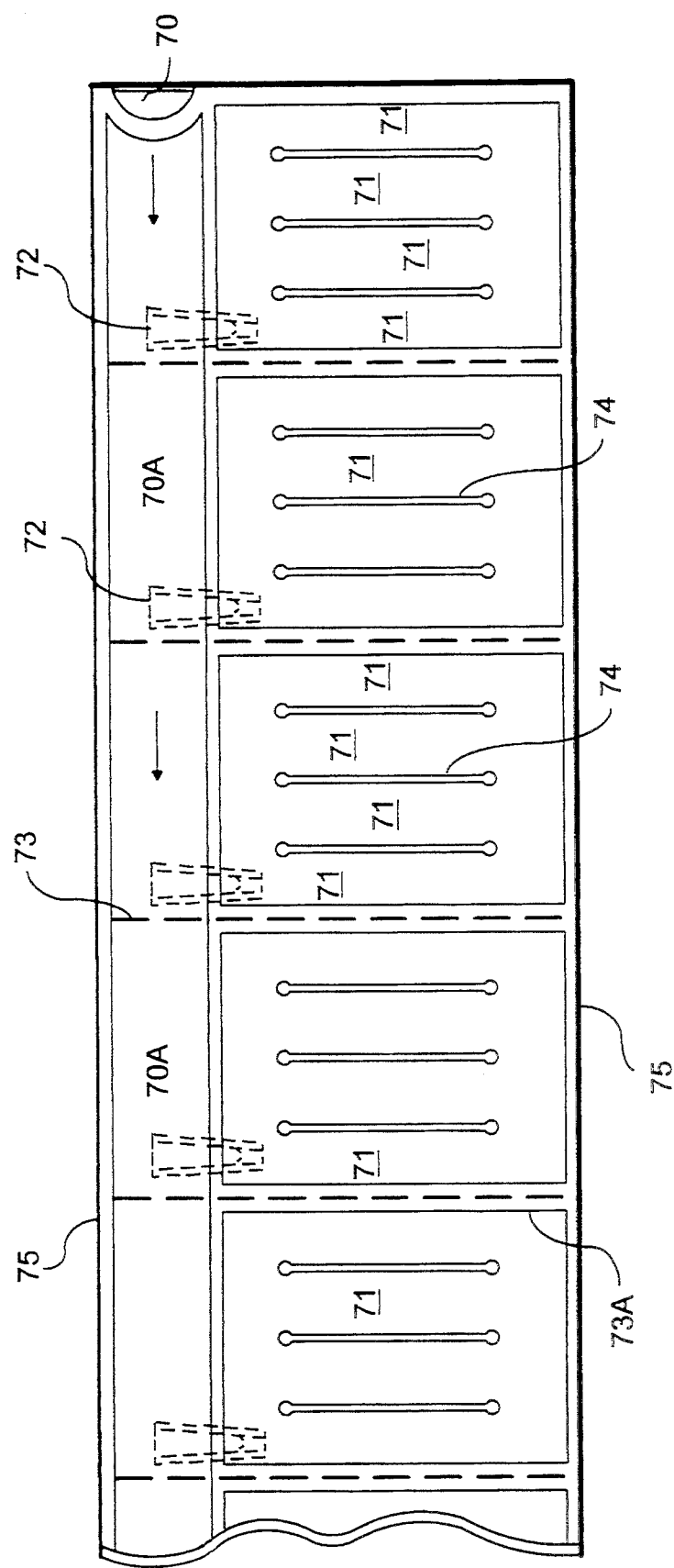
FIG. 3 is a plan view of another embodiment of the invention.

41A Primary air ingress channel of a 2-up bag system
60A Air ingress direction
61 Air compressor
62A Transverse heat seals
63 Heat sealer with optional perforating blade
64A Roll of flat, pre-sealed dual bags
65A One-way self-sealing valves for transfer of air left and right to dual bag chambers
66A Finished, dual bags, inflated and separated from master roll FIG. 3 depicts a strip of inflatable, single, two-ply bags with one chamber containing three heat seals to define four tubular channels in each bag.

Figure 3A:
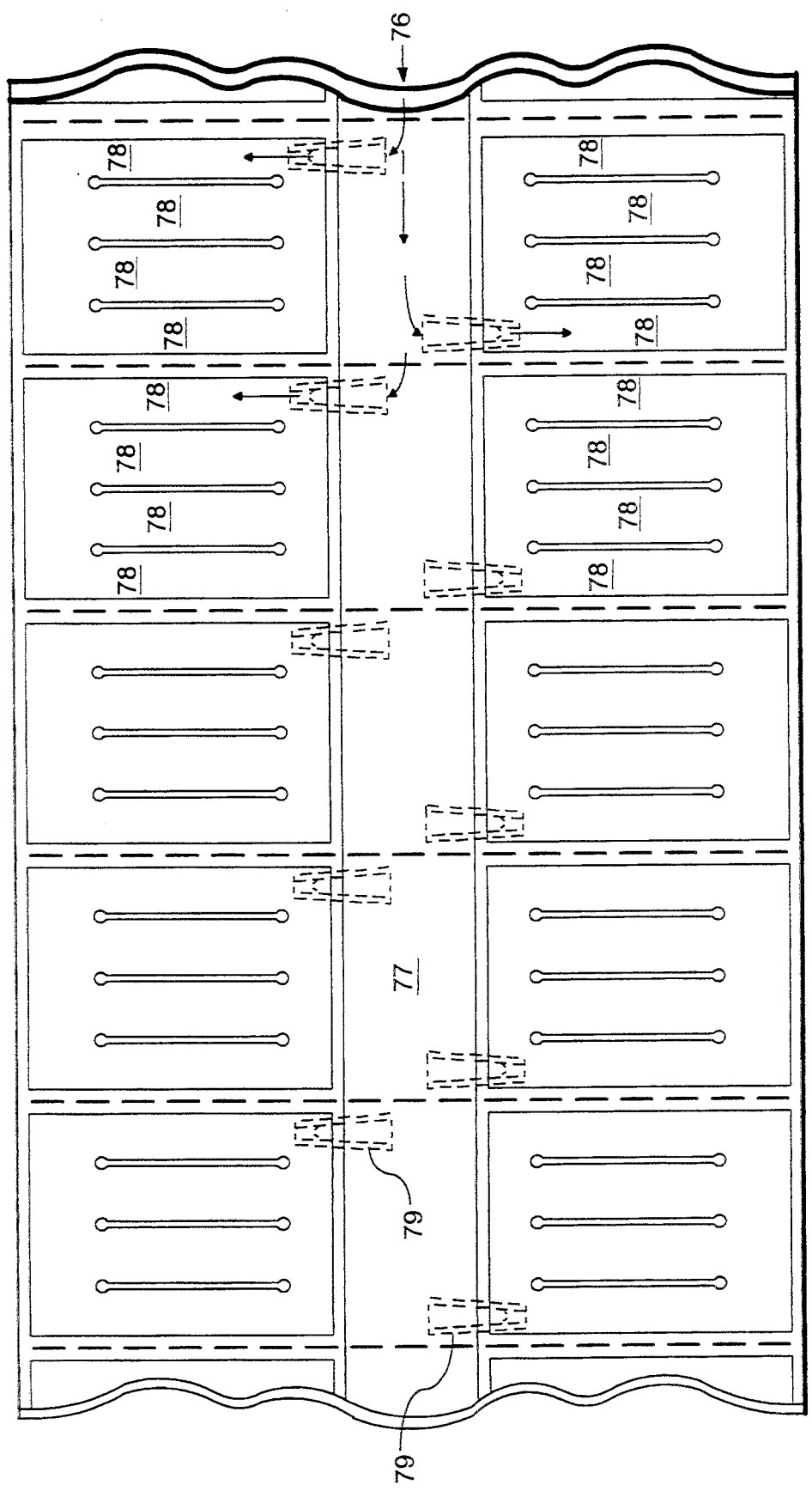
FIG. 3A is a plan view of a modification of the structure of FIG. 3.

70 Air ingress direction
70A Primary channel
71 Tubes within each bag
72 One-way, self-sealing valves for transfer of air from channel 70A to each individual bag
73 Optional perforation for separating one or more bags from supply roll
73A Heat seal, with preformation in center, separating each bag
74 Channel seals in two-ply bag defining four tubes within each bag
75 Outer edge seals on each side of a two-ply web of material FIG. 3A depicts a mirror-image structure comprising two parts each like the structure of FIG. 3, defining a dual bag system, fed with air from a central channel.

Figure 3B:
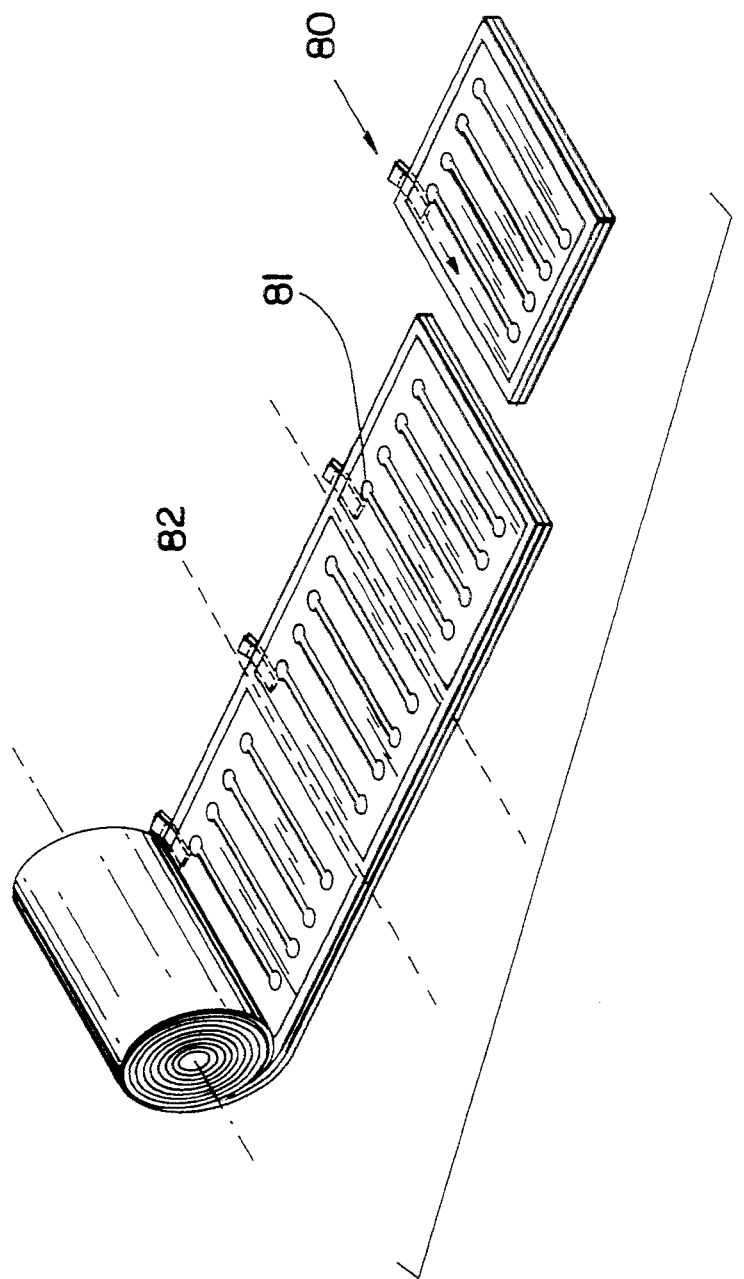
FIG. 3B is a perspective view of a modification of the structure of FIG. 3.

76 Air ingress direction
77 Primary central air channel
78 Individual channels in each pair of single bags
79 One-way, self-sealing valves to transfer air to both bags in each mirror-image FIG. 3B depicts a modification of FIG. 3, whereby the one-way, self-sealing valves are on the outside of one edge of a two-ply bag system on rolls.

80 Air ingress direction from one side of bags
81 Valves, each a two-ply sealed unit with an open center
82 Optional perforation for separating individual bags or groups of bags FIGS. 3C, 3C1, 3C2 and 3C3 define method of attaching the two-ply valve to each wall of a two-ply, inflatable bag.

Figure 3D:
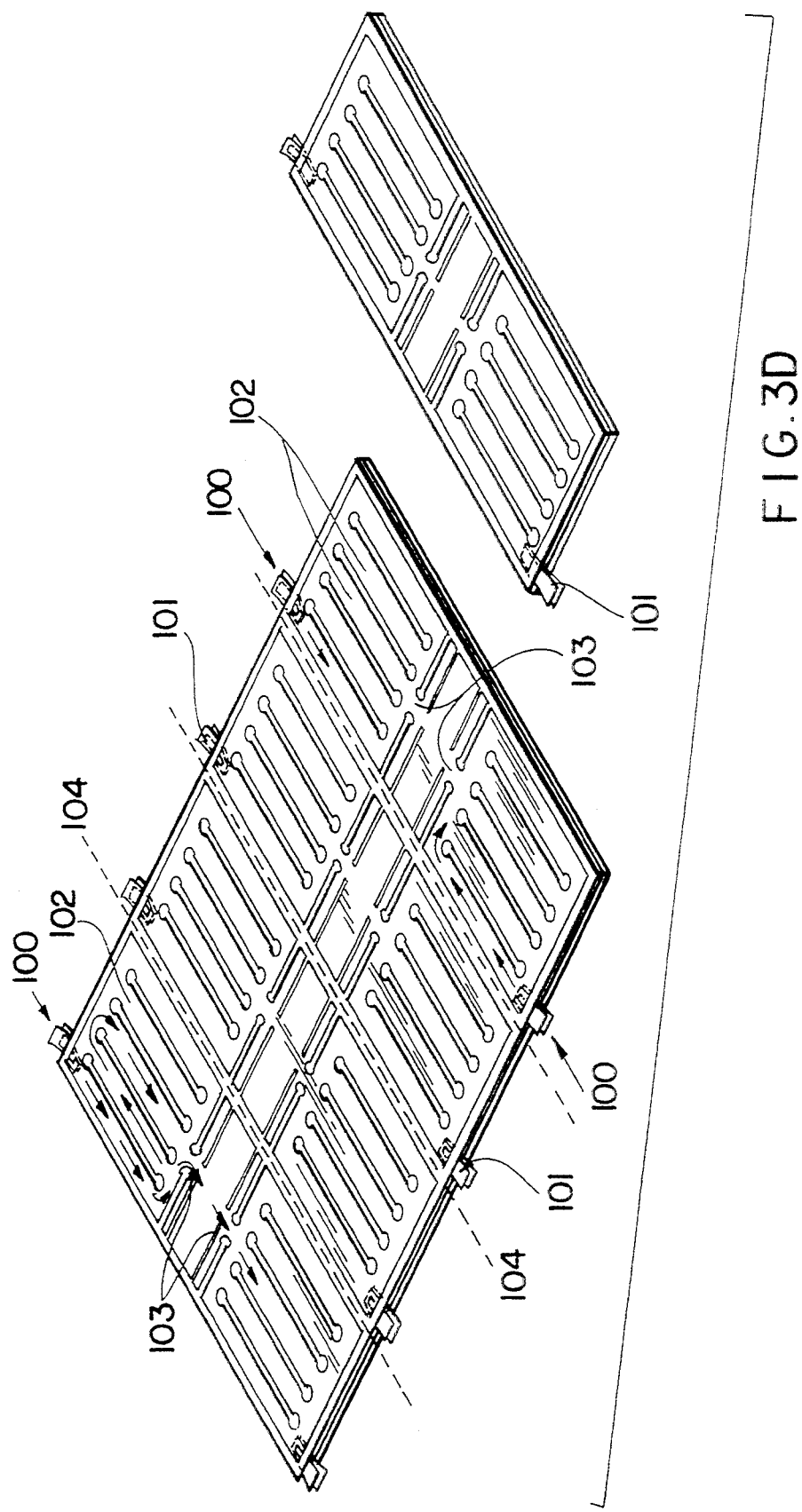
FIG. 3D is a perspective view of a modification of the embodiment shown in FIG. 3B.

91 Primary air ingress channel
92 One-way, self-sealing valves for transfer of ingress air from primary channel to each bag
93 Heat seal that closes the entrance of the primary air channel
94 Outer edge seals that define the machine direction seals
95 Machine direction seal that defines the primary air channel and method of attaching a self-sealing valve to each bag.
95A Depicts an inner channel in each valve that opens to transfer air to each bag from primary channel and collapses to overcome reverse air flow
96 Transverse seals that form four air tubes in each bag
97 Connected air tubes FIG. 3D depicts a modification of the embodiment of the invention shown in FIG. 3B wherein the single bag in FIG. 3B is mirror-imaged so that ingress air can be injected from either edge of a two-ply roll of pre-sealed bags.

Figure 4:
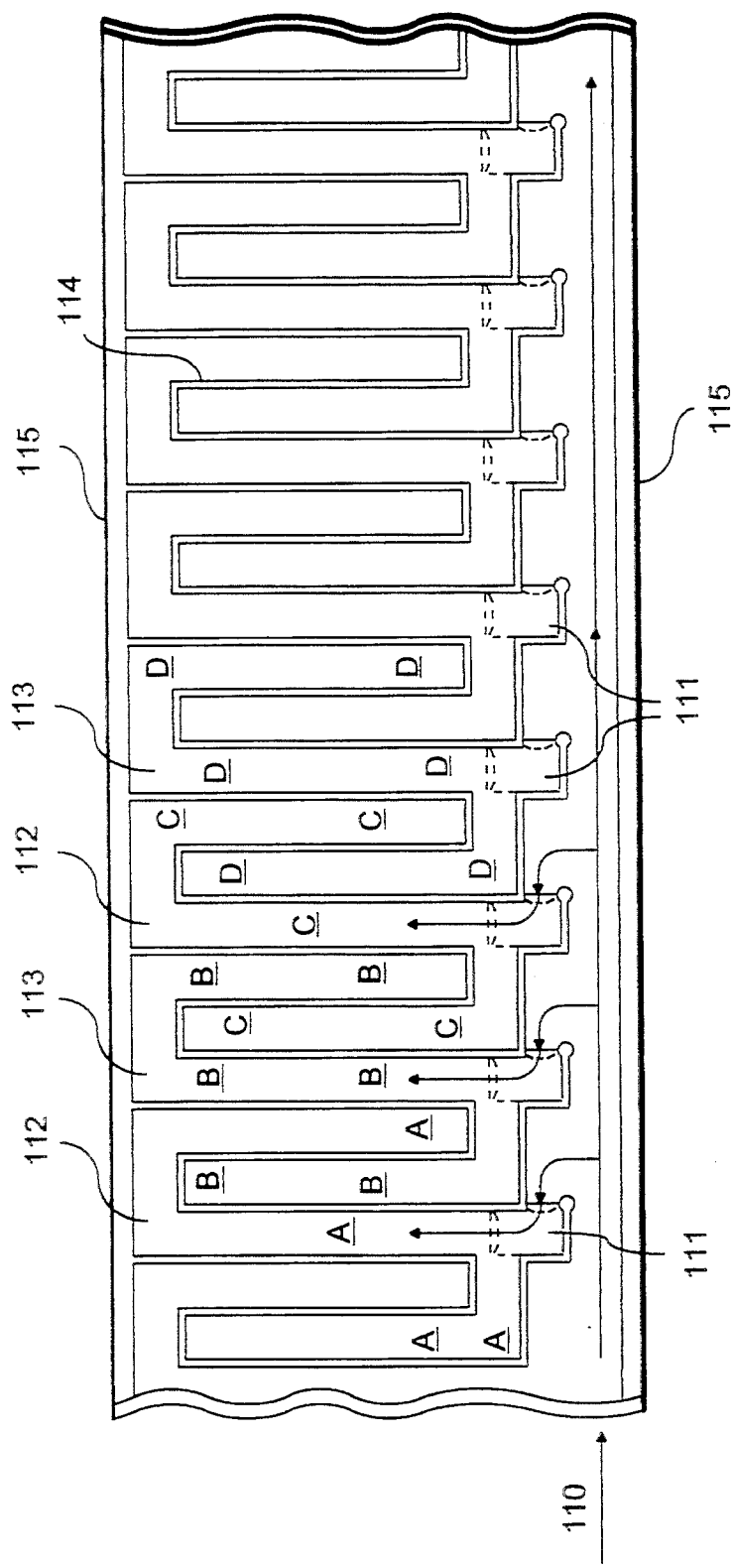
FIG. 4 is a plan view of another embodiment of the invention.

100 Primary air entering through any valve
101 One-way, self-sealing valves
102 Chamber channel in each bag
103 Ports to transfer air from one bag to its duplicate
104 Optional perforation to separate one or more pairs of filled bags FIG. 4 depicts a modification of the invention that provides for a continuous roll of selected material containing a repeat pattern of seal configurations and valves that allow any length of inflatable material to be made into an air-filled wrap. Length of the wrap is controlled either by cutting the desired length at any location or heat-sealing and cutting the length.

110 Primary air ingress channel
111 One-way, self-sealing valves for admitting inflation air to first and second mazes of seals that stop at the end of each maze, thereby isolating the air in each maze from other mazes
112 First maze
113 Second maze
114 Seals that define the mazes
115 Outer edge seals connecting all maze sections
A Defines the internal, confined area of the first maze
B Defines the internal, confined area of the second maze
C Defines the internal, confined area of the third maze
D Defines the internal, confined area of the fourth maze (and continues repeating the confined areas)

Figure 4A:
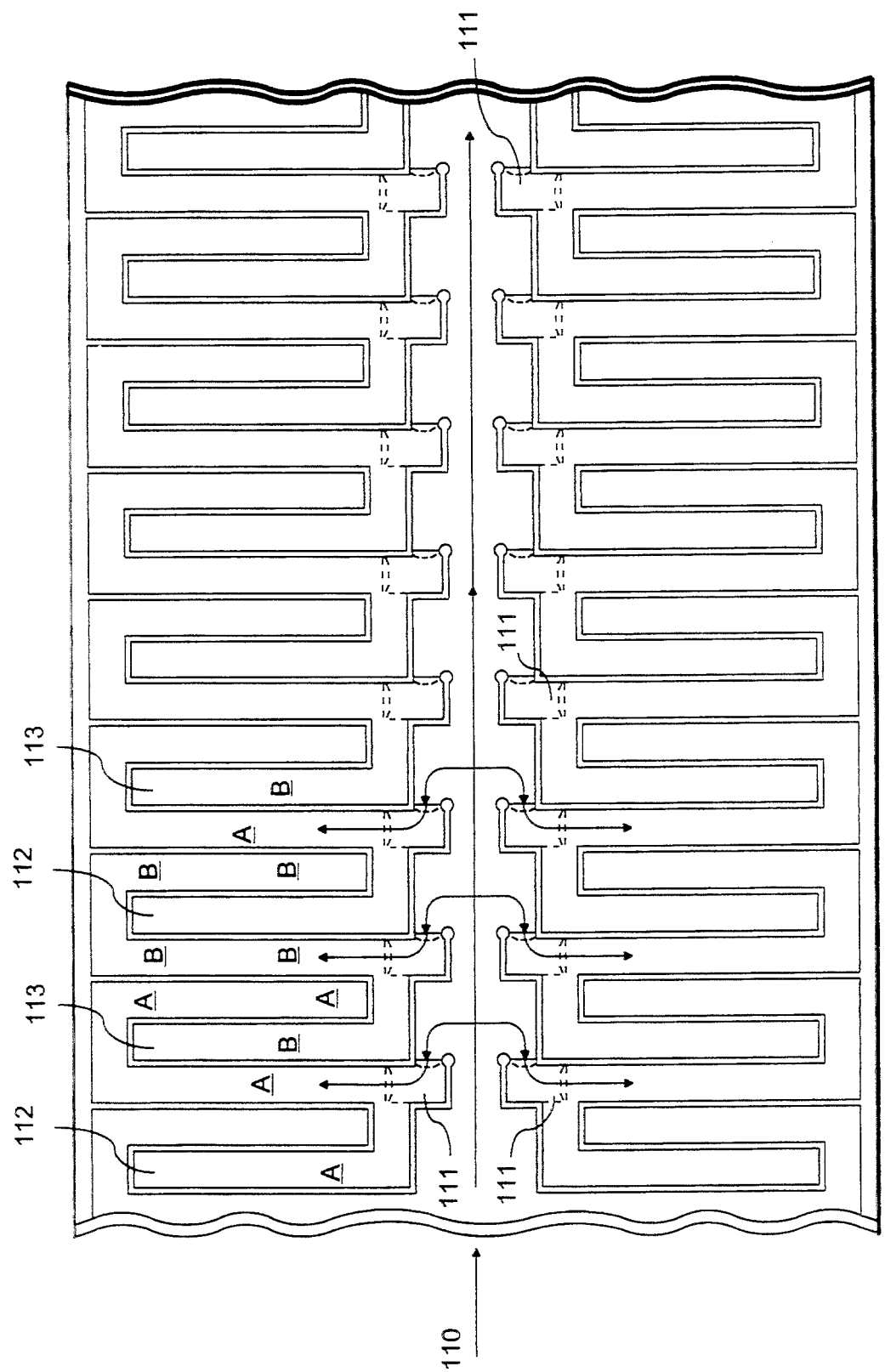
FIG. 4A is a plan view of a modification of the structure of FIG. 4.

FIG. 4A depicts a two-up structure based on FIG. 4 and a mirror-image of FIG. 4 whereby dual maze systems, each having first and second images, can be fed from a central air ingress channel 110 Primary air ingress channel
111 One-way, self-sealing valves feed air to mazes
112 First maze (and repeats)
113 Second maze (and repeats)
A Air in mazes 112
B Air in mazes 113

FIGS. 4B and 4B1 depict a modification of the embodiments in FIG. 4 and FIG. 4A wherein the mirror-image structure of FIG. 4A has a primary air channel with a heat-resistant ink print in the machine direction on both layers of bag walls.

Figure 4C:
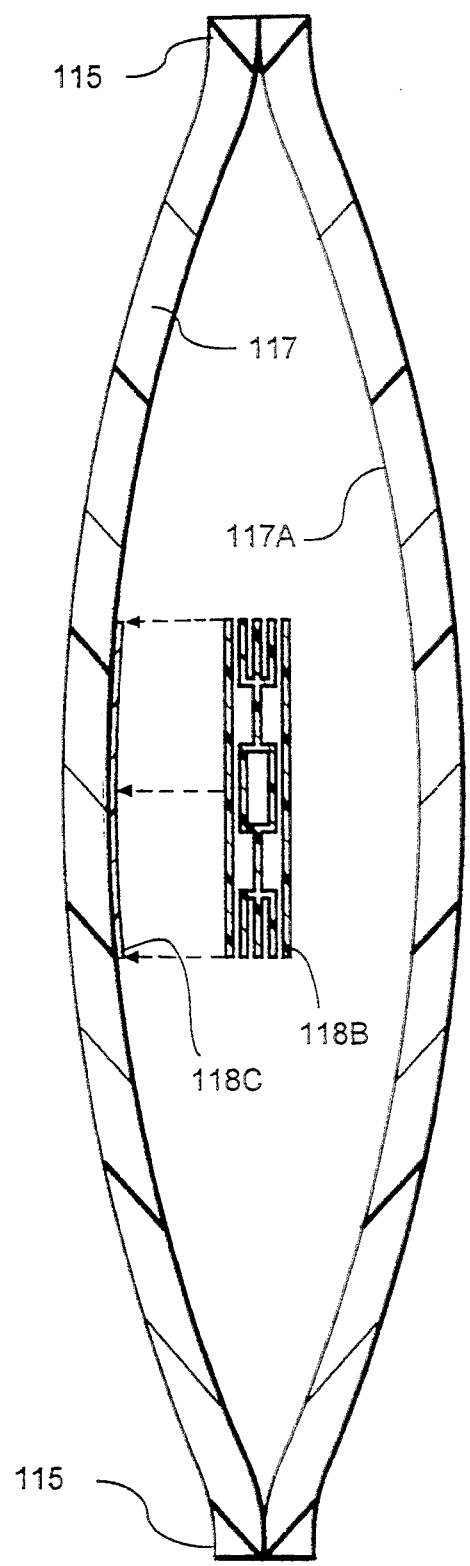
FIG. 4C is a sectional view corresponding to FIG. 4B showing other details of the invention.

110 Primary air ingress channel
114 Input air
115 Dual-bag heat seals
116 Heat seals defining a valve
117 Top bag wall layer
117A Bottom bag wall layer
118 Unsealed mouth of valve
118A Heat-resistant ink print FIG. 4C depicts a single chamber, continuous, inflatable bag material as in FIGS. 4 to 4B, with the modification of a floating valve strip, connected only to those of seals 115 that extend in the transverse direction, either to one wall of the bag or to both walls 117 and 177A thereby providing additional pressure to both valve walls for tight closing of the valve after filling with air.

118B Floating, two-ply valve
118C Location of valve seal at transverse seals that separate each bag. The valve is not sealed to the machine direction seals 115.

FIG. 4C1 depicts a modification of FIGS. 4 to 4C wherein the invention is extended from a single chamber, inflatable system to a dual chamber inflatable system, incorporating features disclosed in prior PHARO inventions issued in U.S. Pat. Nos. 4,597,244, 4,793,123, 4,872,558, 4,874,093, 4,918,904 and 4,949,530.

Figure 4D:
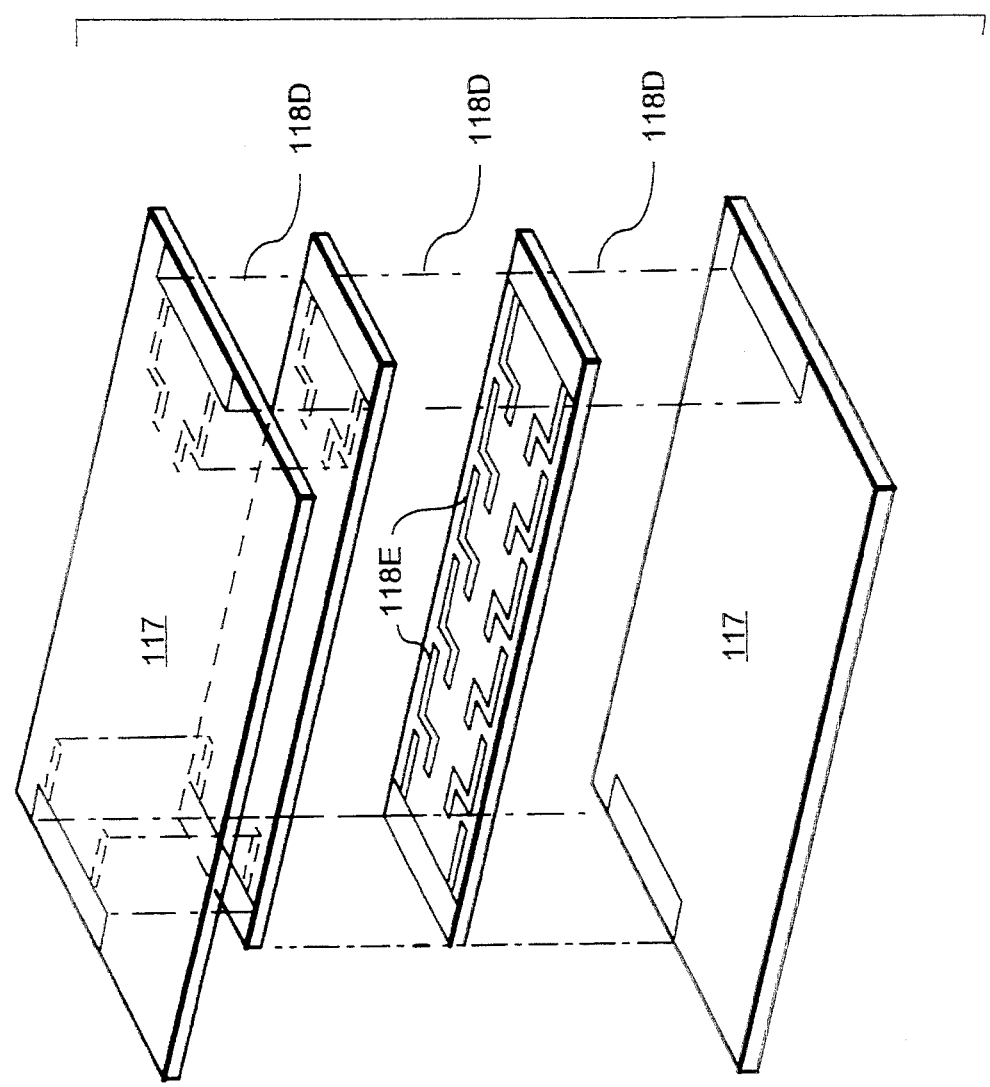
FIG. 4D is all exploded perspective view of a single-chamber inflatable bag structure in accordance with the invention.

115 Machine direction seals
117 Outer bag walls
117B Inner bag walls
118B Floating valve system
118C Optional location of valve-to-wall seals FIG. 4D exploded view of a single-chamber inflatable bag structure.

117 Outer bag walls
117B Floating valve system, two-ply
118D Heat seals connecting the valve system to transverse seals of a continuous inflatable bag material
118E Heat seals, defining continuous access to any number of bags with inflation of air.

FIG. 4D1 depicts a dual-chamber inflatable bag structure as in FIG. 4D.

117 Outer bag walls
117B Inner bag walls
117F Heat sealed hole for use as an air transfer and equalization device as described in PHARO prior art FIGS. 4E and 4E1 depict a completed inflatable bag system (FIG. 4E), on rolls, with one bag separated (FIG. 4E1). Bag contains a floating valve system, two-ply, that is connected to the transverse seals.

Figure 4F:
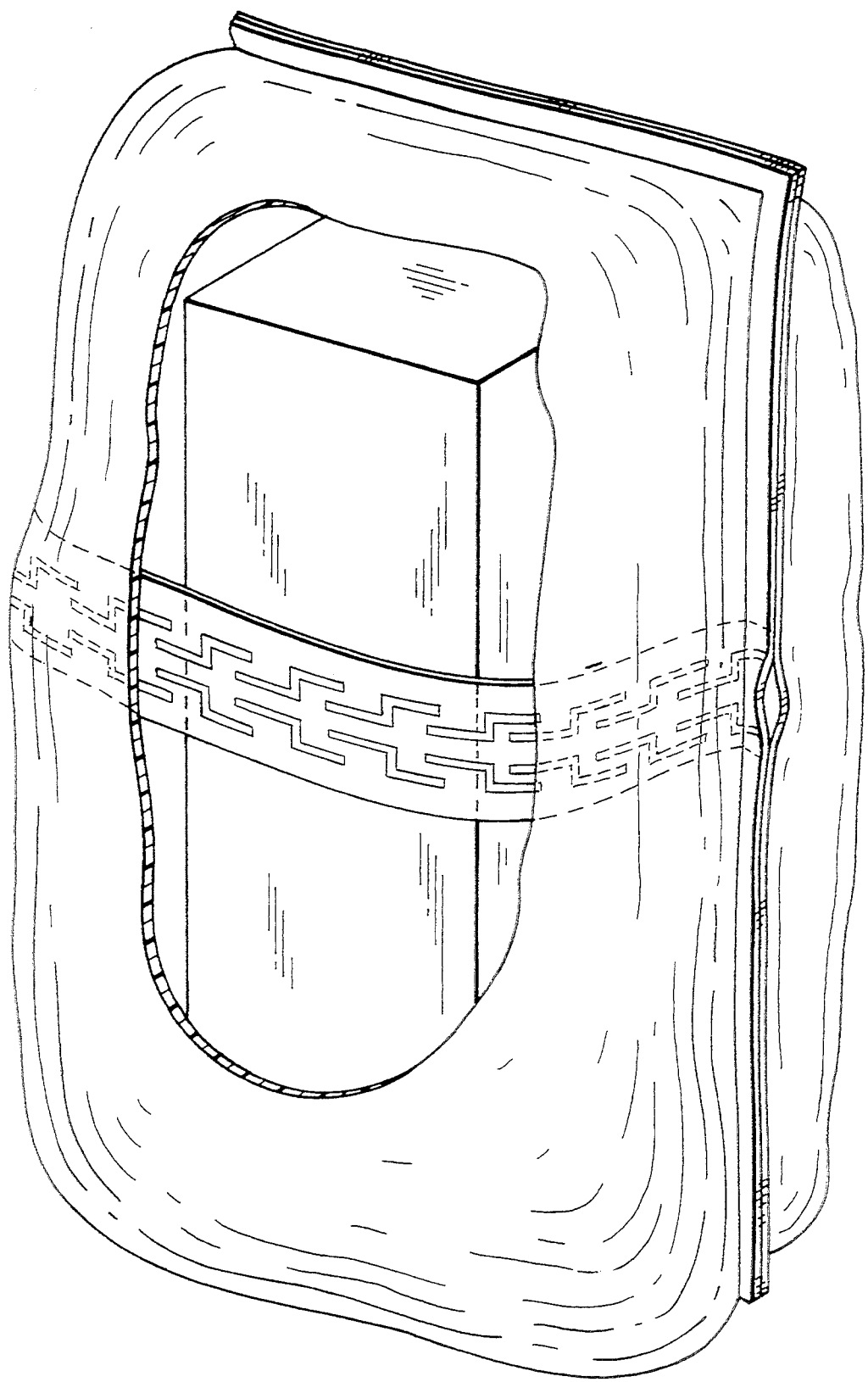
FIG. 4F is a perspective view of a completed package using the invention to package a product of arbitrary size.

114A Air ingress location
118D Heat seals connecting the two-ply valve system to transverse seals FIG. 4F depicts a completed package using the invention to package any size product by selecting an appropriate bag width and length and sealing the transverse sides of each bag. Bag can then be filled through valve access holes.

The "cactus" shape of the valve, seals, containing a heat-resistant ink in the machine direction, can be made in various sizes with varying valve passageways that will optionally increase the filling speed. The valving system can be split in the middle or used on the outer edges of a bag material as a "1-up" valve, filling toward the middle of each bag, as opposed to the center valve system that fills two mirror-image bags.

Figure 5:
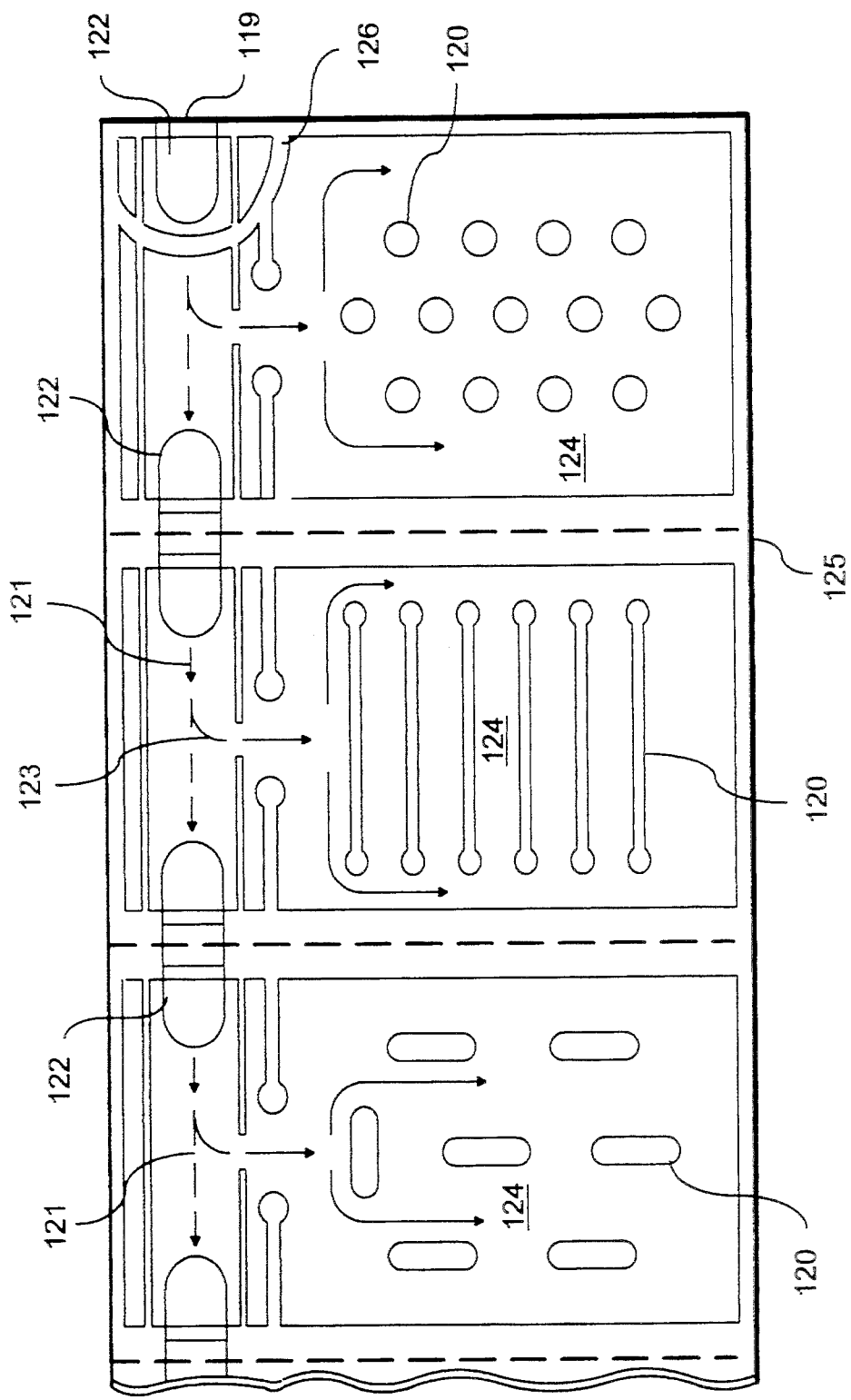
FIG. 5 is a plan view showing another embodiment of the invention.

FIG. 5 depicts unlimited options of bag seals that form the quilting chambers in each bag.

Figure 6:
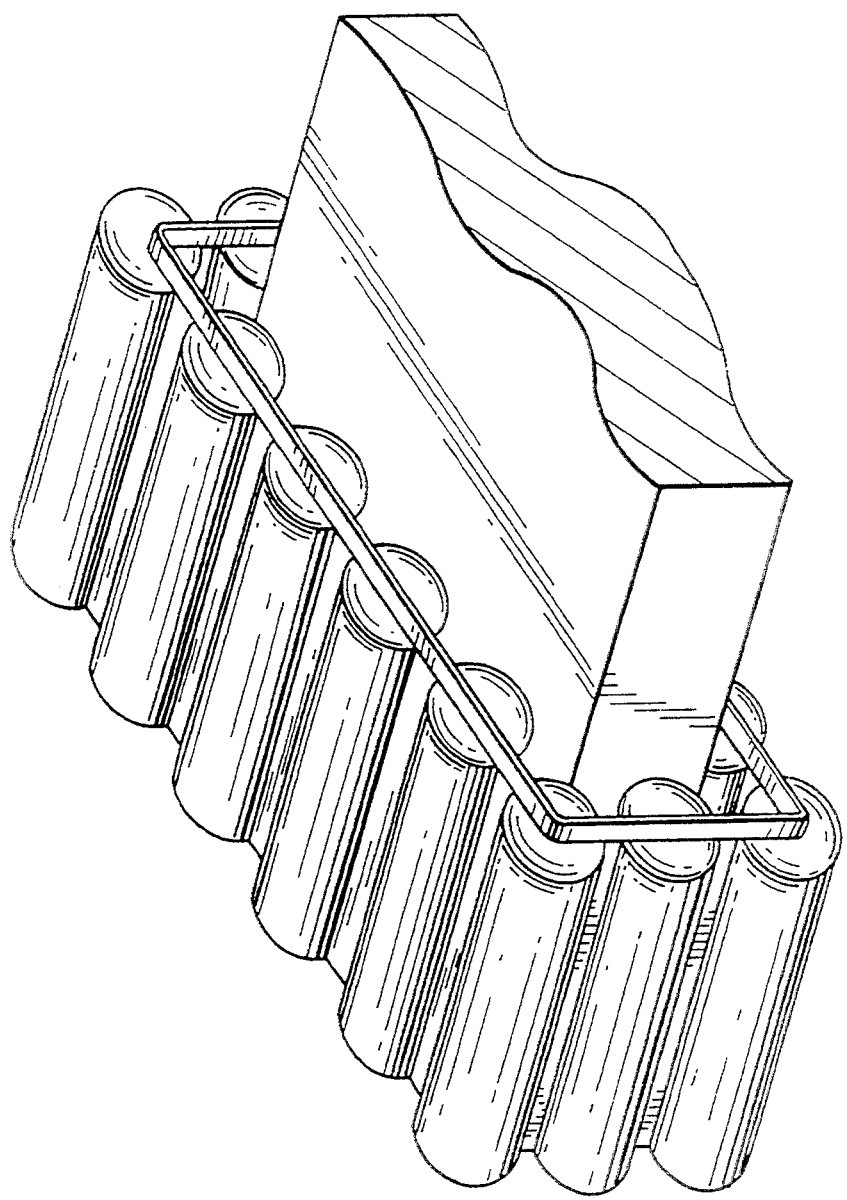
FIG. 6 is a perspective view showing use of the invention to form inflatable end-caps.

119 Input direction of air
120 Variety of seal shapes on two ply-bag construction
121 Primary air channel
122 Primary air passage ports
123 Secondary air ports to each bag section
124 Individual bags with assorted channel and quilt-effect seals
125 Transverse seals, prior to closure seal
126 Closure seal FIG. 6 depicts an optional use of the invention as inflatable end-caps that can replace molded, rigid materials used previously to suspend a product within a carton. The present invention reduces the amount of space required in a carton to furnish this suspension, inasmuch as the pre-sealed inflatable system can be optionally installed without air and filled after the product is in the box. The "quilting" effect also provides an added feature: "soft impact" by use of air instead of a rigid molded insert.

DESCRIPTION OF THE PREFERRED EMBODIMENTS

FIGS. 1, 1A, and 1B illustrate one mode of practicing the invention as applied to a continuous strip of pre-sealed thermoplastic bags, "one-up" and "two-up." Thousands of flat, pre-sealed bags made of thin, tough thermoplastic materials such as polyethylene, vinyl, polypropylene, polyester and numerous other airimpervious plastic film combinations, can be manufactured without being filled with air, then wound on a master roll for shipment and use at a product packaging location. The bag size or desired length of bags can then be custom-fitted at time of packaging. All that is required is compressed air with regulated pressure to inflate the strip either outside a carton or in the carton after wrapping.

FIG. 1 depicts a strip of three separate, but connected pouches made of two plies of packaging material. In use, the desired length of material is removed from its roll and filled with air at 34. Air transfer ports 32 move air 34 along the primary channel 34A and then through access ports 37 to fill each bag section. The valves 32 have heat-resistant ink prints which prevent miscibility during the heat-sealing operation that forms transverse seals 35A.

In order to prevent air escape (by back pressure), a closure seal 31 is made at each end of the strip of material. In practice, air can be inserted at either end of the primary channel 34A as long as closure seals are made after inflation or a self-closing valve is installed at each location 32.

Pre-punched perforations 33, which are optional, facilitate manual separation of any length of pre-sealed bags.

Inflation air continues from primary channel 34A through access ports 37 into each of the four chambers formed by seals 36.

FIG. 1A depicts a dual, "mirror-image" bag series wherein the single bag in FIG. 1 becomes a dual bag 38 with a center channel to provide air to both. Closure seals 31 are used in the same manner as in FIG. 1.

FIG. 1B depicts a flat view and cross section of air-filled bag chambers, all bags being fed from the primary air channel 34A.

FIGS. 1C and 1C1 show a modification of the invention wherein a tubular package is formed by joining two or more single groups of tubular channels. Optional perforations 33 are provided to facilitate cutting off or tearing off desired lengths of the wrapping material. The duplex tubular configuration 39 is illustrated in FIG. 1C1. Optional heat-seals 39A divide the package into multiple tubes.

FIG. 2 depicts a modification of the invention that provides a unique "quilting" effect by having each separate bag section sealed in a "snake" fashion 44 that forms two separate chamber sections within each bag section. By having each chamber fed by its own valve 46 the effect after filling is a unique, tight tubular configuration. This is accomplished by air injection 40 into the primary air channel 41 which transfers the air through valves 46 so that chambers 42 and 43 each fill with air separately.

Outside edge seals 47 form hermetic seals on the two plies of material used to form the continuous strip of bags. Inasmuch as valves 46 are one-way self-closing types, perforations 45 can be made at time of manufacture so that manual tearing of a desire length of bags is facilitated at the packaging location.

FIG. 2A shows another "mirror image" bag complex wherein a dual bag system is created with the use of one central primary air ingress channel 50. The same process described in connection with FIG. 2 will fill the dual bag structure chambers 51 and 52 using one valve 55 for each chamber.

FIG. 2B suggests a packaging system that has provision to hold a roll made in accordance with the invention and dispense the desired length of flat, unfilled bags for filling with air from compressor 61. The system heat sealing device 63 imparts a heat seal 62 at any area along the roll length. The heat seal becomes an edge seal 66 of two bags and can optionally have a perforation in the center of seal 62 thereby forming the seal 62 as two seals 66. The air ingress system works exactly the same as in FIG. 2 and FIG. 2A.

FIG. 2C is a modification of FIGS. 2, 2A and 2B wherein a dual bag system 66A can be produced on a single roll that has a left and a right bag structure and can be filled with air 60A from compressor 61 thorough a central primary air ingress channel 41A. A transverse heat-sealing bar 63A seals and optionally perforates both right and left bags 62A. Pre-sealed roll 64A has left and right valves 65A for transfer of air to each bag.

FIG. 3 depicts a modification of the invention that provides for air ingress 70 through primary channel 70A to each two-ply bag through valves 72. The valves 72 are one-way, self-closing, and they are sealed to the inner walls of primary channel 70A. The four internal channels of each bag 71 are formed with heat seals 74 that fill to tubular shape when air is injected. Perforation 73 can be centered on heat seals 73A that separate each bag, so that one or more bags in a strip can be pulled from a master roll for packaging use. Edge seals 75 are machine-direction seals that join two plies of material as well as each individual bag.

FIG. 3A is a mirror-image of the single bag strip in FIG. 3, wherein two bag strips can be manufactured on one master roll with a primary center channel 77 that will accept ingress air 76 and fill both strips of bags through valves 79. This mode of manufacture enables the production of wide webs of unfilled bags that can be filled with air at a packaging location.

FIG. 3B depicts a modification of FIG. 3 wherein the one-way, self-sealing valves 81 are installed at the outside edge of a single bag strip. This facilitates automated packaging systems that use robotics for feeding and filling bags with air. A robot can open valves 81, inject air, and optionally tear perforation 82 or pass this perforation to other bag locations. Bags on rolls are universally accepted as a medium for automatic filling systems.

FIG. 3C describes a preferred method of attaching one-way, self-sealing valves 92 to the inner walls of primary ingress channel 91. Seals 95 are machine-direction seals that join each valve 92 to 91. Heat seal 93 is a seal that closes the air ingress channel 91 so that injected air cannot back out even after the one-way valves have secured the air inside each individual bag. Each valve has a printed insulator 95A on the inside of one or both valve plies. This prevents heat-sealing the valves closed during in-line manufacture of the bags. Seals 96 establish the four inner tubes 97 of each bag.

FIG. 3D depicts a modification of the invention shown in FIG. 3B wherein filling valves 101 are on each outside edge of a dual mirror-image bag system. In practice, primary air 100 can be injected at either or both edges of the dual web. By having two transfer ports 103 in each pair of bags, filling of a dual bag set can be accelerated. This will also equalize the internal air pressure in all chamber channels 102. An optional perforation 104 separates each pair of bags.

FIG. 4 is a preferred embodiment of this invention, as it provides an inflatable packaging material, on continuous rolls, uninflated until ready for use at a packaging site. In addition, the unique repetition of "maze"-type sealed sections allows the customization of any size of inflated wrapping material.

In practice, a primary air ingress channel 110 feeds compressed air to the one-way, self-sealing valves each of which serves a unique maze design (A) or (B). Valves 111 enable air from the primary channel 110 to pass through an opening 111A at the mouth of each valve. Heat-seal lines 114 section off each repeat of maze channels 112 and 113. These maze channels will fill to the limits of (A) in 112 and (B) in 113 and continue to repeat the seal and maze configurations defined by areas 112 and 113, (A) and (B) respectively. Edge seals 115 provide a continuous seal for both maze groups.

In effect, a two-ply packaging material, heat-sealed in accordance with the method described in this embodiment, offers major space-savings and reduced freight costs in that one roll of 100 pounds of un-inflated material displaces only 2 to 4 cubic feet. In contrast, the traditional "bubble-pack" packaging material, produced and shipped filled with air in each bubble, requires much more shipping and storage volume. That is, 100 pounds of pre-filled "bubble-pack" will require 1500 to 3500 cubic feet of truck or warehouse space.

Another improvement over "bubble-pack" is that the use of thicker materials is possible with this invention. Normally, pre-filled "bubble-pack" is made of polyolefin films from 0.002" to 0.008" thick. The present invention can be produced in any thermoplastic film that is heat sealable, including polyolefins (all types), polyvinylchloride, polybutylene, polyetherimides, ionomers, polyesters and several co-extruded or laminated film structures.

FIG. 4A depicts the "mirror-image" concept of previous embodiments described herein. A roll of 112 and 113 mazes repeatedly sealed in the machine direction, but with a primary air ingress channel 110 between the dual-facing mazes, enables the production of wider inflatable packaging material, sometimes identified as "dunnage." In addition, the dual-maze material can be optionally slit down the center into two separate single maze strips. This is possible in that the valves are self-sealing.

FIG. 4B shows another preferred embodiment of this invention that provides for a continuous channel in the center of a mirror-image dual bag depicted in FIG. 4A. This channel forms a continuous tunnel that links a roll of dual bags with a common air supply to each bag's inner chamber. Primary air ingress 114 feeds in the machine direction, transferring air left and right into the dual-bag arrangement. Heat seals 115 define adjacent bags. Seals 116 define a valve-like self-sealing passage that closes at 118 when each bag has the desired inflation. The continuous roll of two-ply material has the repeat seal patterns 115, 116 thereby allowing any length of inflatable packaging material to be dispensed at the user's location. Seals 115 can be placed at any location, in advance of inflation or at the packager's option can be installed with a heat-sealing machine at time of filling. A heat-resistant ink print 118A down the center of the primary air ingress channel prevents heat seals 115 from joining the top layer 117 and bottom layer 117A at the heat-resistant ink print location, thereby providing another preferred embodiment of refilling bags with air, after they are cut from a continuous roll and filled initially. This enables reuse of each bag or bag length.

FIG. 4C shows a single-chamber, continuous, inflatable bag material provided with a floating valve strip. The floating valve strip 18B is connected to transverse seals 115 but not to machine-direction seals 115. It can be connected to one wall 117 of the bag or to both walls 117, 117A, thereby providing additional pressure to both valve walls for tight closing of the valve after filling with air.

FIG. 4C1 discloses a dual-chamber inflatable system and is otherwise similar to the embodiment of the invention shown in FIG. 4C.

FIG. 4D is an exploded view of a single-chamber inflatable bag structure including outer bag walls 117 and floating valve system 118B. Heat seals 118D connect the valve system to the transverse seals of a continuous inflatable bag material. Heat seals 118E define continuous access to any number of bags with inflation air.

FIG. 4D1 is an exploded view of a dual-chamber inflatable bag structure as in FIG. 4D. The structure of FIG. 4D1 includes outer bag walls 117 and inner bag walls 117B. A heat-sealed hole 117F is used as an air transfer and equalization device.

FIG. 4E shows a completed inflatable bag system, on rolls, with one bag separated. The bag contains a floating valve system, two-ply, that is connected to the transverse seals. The air ingress location is shown at 114A. Heat seals 118D connect the two-ply valve system at the transverse seals.

FIG. 4F shows a completed package in accordance with the invention employed to package a product of any size by selecting an appropriate bag width and length and sealing the transverse sides of each bag. The bag can then be filled through valve access holes.

The "cactus" shape of the valve seals, containing a heat-resistant ink in the machine direction, can be made in various sizes with varying valve passageways that will optionally increase the filling speed. The valving system can be split in the middle or used on the outer edges of a bag material as in a "one-up" structure, filling towards the middle of each bag, as opposed to the center valve system that fills two mirror-image bags.

FIG. 5 depicts optional heat seal patterns 120 that can be placed anywhere within the confines of each inflatable bag. The result of unique seal configurations is a variety of quilting effects as well as control of the amount of air that will go into a given section 124.

In practice, primary air ingress ports 122 are not self-sealing, but designed to pass primary air along channel 121 through ports 123 into each bag section 124. Closure seal 126 is essential to using strips of this design as the pass-through ports 122 are open until each transverse side of each bag is sealed at 126. Transverse seals 125 allow ingress ports 122 to move ingress air along primary channel 121 and into respective bags through ports 123. A closure seal 126 is required at both ends of a selected length of bags so that bag pressure will not release air from chambers 124 back to the atmosphere.

FIG. 6 shows an optional use of the invention as inflatable end caps that can replace molded, rigid materials formally employed to suspend a product within a carton. The present invention reduces the amount of space required in a carton to accomplish this suspension. The pre-sealed inflatable system can be optionally installed without air and filled after the product is in the carton. The quilting effect also provides an added feature: soft impact by use of air instead of a rigid, molded insert.

Thus there is provided in accordance with the invention a novel and highly effective inflatable wrapping material comprising a multiple-ply web of sealed thermoplastic film material that can be shipped on rolls, uninflated, to end users who will customize their product protective wrapping by inflating the wrapping material at time of use. Many modifications of the preferred embodiments of the invention disclosed herewith will readily occur to those skilled in the art. All such modifications are intended to be included within the scope of the appended claims.

I claim:

1. An inflatable wrapping material for wrapping a product, said wrapping material comprising:
   a plurality of thermoplastic, flexible, elongate film plies disposed in overlying relationship to each other, said plies being formed with:
   a pattern of heat seals defining a plurality of chambers along the length of said plies;
   a primary channel extending between said plies along the length thereof through which an inflation medium is transmitted along the length of said plies; and
   one-way valve means connecting said primary channel to each of said chambers so that at least one of said chambers is prevented from fluid communication with at least one other of said chambers;
   whereby:
   said wrapping material can be stored and shipped uninflated and any desired length thereof can be selected for wrapping a product and inflated by said inflation medium, said wrapping material therefore occupying relatively little space during storing and shipping and in use protecting the wrapped product by providing a cushion including the inflation medium.

2. An inflatable wrapping material according to claim 1 formed with at least four of said plies.

3. An inflatable wrapping material according to claim 1 formed by joining at least two of said inflatable wrapping materials at at least one location common to a respective ply of each of said inflatable wrapping materials.

4. An inflatable wrapping material according to claim 1 further comprising a pre-formed perforation to facilitate manual separation of any desired length of said wrapping material.

5. An inflatable wrapping material according to claim 1 wherein said chambers are arranged "one-up" and said primary channel extends along an edge of said wrapping material.

6. An inflatable wrapping material according to claim 1 wherein said chambers are arranged "two-up" and said primary channel extends along the middle of said wrapping material.

7. An inflatable wrapping material according to claim 6 wherein chambers on each side of said primary channel are substantially mirror images of chambers in the other side of said primary channel.

8. An inflatable wrapping material according to claim 1 wherein said heat seals partially restrict said chambers to form a quilting effect.

9. An inflatable wrapping material according to claim 1 wherein said heat seals form first and second mazes, and wherein separate one-way valve means are provided for each of said mazes.

10. An inflatable wrapping material according to claim 9 wherein said chambers are arranged "two-up" and said primary channel extends along the middle of said wrapping material.

11. An inflatable wrapping material according to claim 1 further comprising a heat-sealing device for forming heat seals at desired locations along said wrapping material after said primary channel has at least been partially inflated and compressor means for supplying said inflation medium.

12. An inflatable wrapping material according to claim 11 wherein said inflation medium is air, further comprising a pressure regulator to prevent overinflation of said chambers with said air.

13. An inflatable wrapping material for wrapping a product, said wrapping material comprising:
   a plurality of thermoplastic, flexible, elongate film plies disposed in overlying relationship to each other, said plies being formed with:
   a pattern of heat seals defining a plurality of chambers along the length of said plies;
   a primary channel extending between said plies along the length thereof through which an inflation medium is transmitted along the length of said plies; and
   one-way valve means connecting said primary channel to each of said chambers;
   whereby:
   said wrapping material can be stored and shipped uninflated and any desired length thereof can be selected for wrapping a product and inflated by said inflation medium, said wrapping material therefore occupying relatively little space during storing and shipping and in use protecting the wrapped product by providing a cushion including the inflation medium;
   further comprising a heat-resistant material applied to said plies to prevent said heat-seals from forming at specified locations along said plies.

14. An inflatable wrapping material according to claim 1 wherein said valve means comprises a string of a plurality of said valves, said string being connected to said plies at spaced-apart locations and said valves floating between said plies.

15. A method of forming an inflatable wrapping material, uninflated and in roll form for customized use at a user's packaging station, the method comprising the steps of:
   providing two plies of superimposed, thermoplastic, flexible films, each film having a thickness within the range of 0.005" to 0.060";
   forming a continuous heat-seal pattern that segments the plies into a plurality of separate chambers;
   forming a primary channel through which injected air is transmitted along an unlimited length of said plies; and
   forming one-way valve means for diverting portions of said air into the individual chambers so that at least one of said chambers is prevented from fluid communication with at least one other of said chambers;
   whereby a user can select a length of roll stock when packaging a product, wrap the selected length of roll stock around the product in one or more directions, and inflate the selected length of roll stock to provide an air cushion for protecting the product.

16. A method of forming an inflatable wrapping material comprising the steps of:

stacking a plurality of piles of elongate, thermoplastic, flexible film to form a composite elongate structure;

forming a continuous heat-seal pattern segmenting the composite structure into separate, inflatable chambers disposed serially along the length of the composite elongate structure;

forming a channel along the length of the composite elongate structure; and forming one-way valve means connecting the channel to each of the chambers so that at least one of said chambers is prevented from fluid communication with at least one other of said chambers; whereby:

the composite elongate structure can be separated at a selected location to provide a desired length of wrapping material for wrapping a product, said length of wrapping material including at least one of said chambers; and said at least one chamber can be inflated to provide a cushion for protecting the product.

17. A method according to claim 16 comprising the further step of forming discontinuous heat seals within said chambers to limit the expansion of said chambers when inflated and thereby produce a quilting effect.

18. A method according to claim 16 wherein the continuous heat-sealing pattern segmenting the composite structure into separate, uninflated chambers disposed serially along the length of the composite elongate structure has the form of a maze.

* * * * *